United States Patent
Chen et al.

(10) Patent No.: US 12,169,875 B2
(45) Date of Patent: Dec. 17, 2024

(54) MODEL TRAINING METHOD AND APPARATUS FOR IMAGE RECOGNITION, NETWORK DEVICE, AND STORAGE MEDIUM

(71) Applicant: TENCENT TECHNOLOGY (SHENZHEN) COMPANY LIMITED, Shenzhen (CN)

(72) Inventors: Weidong Chen, Shenzhen (CN); Baoyuan Wu, Shenzhen (CN); Wei Liu, Shenzhen (CN); Yanbo Fan, Shenzhen (CN); Yong Zhang, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1064 days.

(21) Appl. No.: 17/083,180

(22) Filed: Oct. 28, 2020

(65) Prior Publication Data
US 2021/0042580 A1 Feb. 11, 2021

Related U.S. Application Data

(63) Continuation of application No. PCT/CN2019/110361, filed on Oct. 10, 2019.

(30) Foreign Application Priority Data
Oct. 10, 2018 (CN) .......................... 201811180282.2

(51) Int. Cl.
*G06T 1/20* (2006.01)
*G06F 18/214* (2023.01)
(Continued)

(52) U.S. Cl.
CPC .............. *G06T 1/20* (2013.01); *G06F 18/214* (2023.01); *G06N 3/04* (2013.01); *G06N 3/063* (2013.01);
(Continued)

(58) Field of Classification Search
CPC ............................. G06V 10/82; G06V 10/764
See application file for complete search history.

(56) References Cited

U.S. PATENT DOCUMENTS

2016/0321522 A1* 11/2016 Yuan ...................... G06F 18/214
2018/0121533 A1* 5/2018 Magnani ................ G06N 3/045
(Continued)

FOREIGN PATENT DOCUMENTS

CN 107506740 A 12/2017
CN 107818314 A 3/2018
(Continued)

OTHER PUBLICATIONS

E. Ahmed, M. Jones and T. K. Marks, "An improved deep learning architecture for person re-identification," 2015 IEEE Conference on Computer Vision and Pattern Recognition (CVPR), Boston, MA, USA, 2015, pp. 3908-3916, doi: 10.1109/CVPR.2015.7299016. (Year: 2015).*
(Continued)

*Primary Examiner* — Omar F Fernandez Rivas
*Assistant Examiner* — Quinlan E Stankus
(74) *Attorney, Agent, or Firm* — ANOVA LAW GROUP, PLLC

(57) ABSTRACT

A model training method and apparatus for image recognition, and a non-transitory storage medium are provided. The model training method includes: obtaining a multi-label image training set including a plurality of training images each annotated with a plurality of sample labels; selecting target training images from the multi-label image training
(Continued)

set for training a current model; performing label prediction on each target training image using the current model, to obtain a plurality of predicted labels of the each target training image; obtaining a cross-entropy loss function corresponding to the plurality of sample labels of the each target training image, a positive label loss being greater than a negative label loss and having a weight greater than 1; converging the predicted labels and the sample labels of the each target training image according to the cross-entropy loss function, and updating parameters of the current model, to obtain a trained model.

16 Claims, 8 Drawing Sheets

(51) Int. Cl.
| G06N 3/04 | (2023.01) |
| G06N 3/063 | (2023.01) |
| G06N 3/08 | (2023.01) |
| G06T 3/4046 | (2024.01) |
| G06V 10/764 | (2022.01) |
| G06V 10/774 | (2022.01) |
| G06V 10/82 | (2022.01) |

(52) U.S. Cl.
CPC .............. *G06N 3/08* (2013.01); *G06T 3/4046* (2013.01); *G06V 10/764* (2022.01); *G06V 10/7753* (2022.01); *G06V 10/82* (2022.01)

(56) References Cited

U.S. PATENT DOCUMENTS

| 2018/0268292 | A1 | 9/2018 | Choi et al. | |
| 2019/0065994 | A1* | 2/2019 | Wang | G06F 18/214 |
| 2020/0160124 | A1* | 5/2020 | Fu | G06V 10/764 |
| 2021/0073553 | A1* | 3/2021 | Halliday | G06V 10/82 |

FOREIGN PATENT DOCUMENTS

| CN | 108197669 A | 6/2018 |
| CN | 108416318 A | 8/2018 |
| CN | 108416384 A | 8/2018 |
| CN | 110163234 A | 8/2019 |

OTHER PUBLICATIONS

The World Intellectual Property Organization (WIPO) International Search Report for PCT/CN2019/110361 Dec. 31, 2019 6 Pages (including translation).
Kaiming He et al., "Identity Mappings in Deep Residual Networks," arXiv preprint arXiv:1603.05027, 2016. 15 pages.
Kaiming He et al., "Deep residual learning for image recognition," In: CVPR. (2016) 12 pages.
Vinod Nair et al., "Rectified linear units improve restricted boltzmann machines," In: ICML. (2010) 8 pages.
Olga Russakovsky et al., "ImageNet Large Scale Visual Recognition Challenge," JCV (2015) 43 pages.
Tsung-Yi Lin et al., "Microsoft COCO: Common objects in context," In: ECCV. (2014) 15 pages.
Sepp Hochreiter et al., "Long short-term memory," Neural computation (1997) 32 pages.
Rupesh Kumar Srivastava et al., "Highway networks," In: ICML workshop. (2015) 6 pages.
Rupesh Kumar Srivastava et al., "Training very deep networks," In: NIPS. (2015) 11 pages.
Sergey Ioffe et al., "Batch normalization: Accelerating deep network training by reducing internal covariate shift," In: ICML. (2015) 11 pages.
Y. Lecun et al., "Backpropagation applied to handwritten zip code recognition," Neural computation (1989) 11 pages.
Alex Krizhevsky, "Learning multiple layers of features from tiny images," Tech Report (2009) 60 pages.
G. E. Hinton et al., "Improving neural networks by preventing co-adaptation of feature detectors," arXiv:1207.0580 (2012) 18 pages.
Djork-Arne Clevert et al., "Fast and accurate deep network learning by exponential linear units (ELUs)," In: ICLR. (2016) 14 pages.
Benjamin Graham, "Fractional max-pooling," arXiv:1412.6071 (2014) 10 pages.
Jost Tobias Springenberg et al., "Striving for simplicity: The all convolutional net," arXiv:1412.6806 (2014) 14 pages.
Min Lin et al., "Network in network," In: ICLR. (2014) 10 pages.
Chen-Yu Lee et al., "Deeply-supervised nets," In: AISTATS. (2015) 9 pages.
Adriana Romero et al., "Fitnets: Hints for thin deep nets," In: ICLR. (2015) 13 pages.
Dmytro Mishkin et al., "All you need is a good init," In: ICLR. (2016) 13 pages.
Christian Szegedy et al., "Rethinking the inception architecture for computer vision," In: CVPR. (2016) 9 pages.
Christian Szegedy et al., "Going deeper with convolutions," In: CVPR. (2015) 9 pages.
Christian Szegedy et al., "Inception-v4, inception-resnet and the impact of residual connections on learning," arXiv:1602.07261 (2016) 12 pages.
Karen Simonyan et al., "Very deep convolutional networks for large-scale image recognition," In: ICLR. (2015) 14 pages.
Kaiming He et al., "Delving deep into rectifiers: Surpassing human-level performance on imagenet classification," In: ICCV. (2015) 9 pages.
The China National Intellectual Property Administration (CNIPA) The First Office Action for Chinese Application 201811180282.2 Aug. 29, 2022 10 Pages (With Translation).

* cited by examiner

MODEL TRAINING METHOD AND APPARATUS FOR IMAGE RECOGNITION, NETWORK DEVICE, AND STORAGE MEDIUM

CROSS-REFERENCES TO RELATED APPLICATIONS

This application is a continuation application of PCT Patent Application No. PCT/CN2019/110361, filed on Oct. 10, 2019, which claims priority to Chinese Patent Application No. 201811180282.2, filed with the National Intellectual Property Administration, PRC on Oct. 10, 2018 and entitled "MODEL TRAINING METHOD AND APPARATUS, AND STORAGE MEDIUM", the entire contents of both of which are incorporated herein by reference.

FIELD OF THE TECHNOLOGY

The present disclosure relates to the field of communications technologies, and in particular, to a model training method and apparatus for image recognition, a network device, and a storage medium.

BACKGROUND OF THE DISCLOSURE

With the development of a deep learning model and training method, great progress is also made in the field of computer vision, and a research direction gradually changes from low-level image processing and image recognition to higher-level visual understanding. Complex visual tasks need to use a deep neural network model that has better visual representation potential.

Currently, a deep neural network model trained on a large-scale multi-label image training set has better visual performance, and the quality of a large-scale multi-label image data set determines the visual performance and accuracy of the deep neural network model. Currently, a disclosed large-scale multi-label image data set, namely, ML-Images, may include 11166 labels, and 18019881 training images. In the art, a deep neural network model is generally trained on the image data set.

SUMMARY

An embodiment of the present disclosure provides a model training method for image recognition, performed by a network device, the method including: obtaining a multi-label image training set, the multi-label image training set including a plurality of training images, and each training image being annotated with a plurality of sample labels; selecting target training images from the multi-label image training set for training a current model; performing label prediction on each target training image by using the current model, to obtain a plurality of predicted labels of the each target training image; obtaining a cross-entropy loss function corresponding to the plurality of sample labels of the each target training image, a positive label loss in the cross-entropy loss function being provided with a weight, the weight being greater than 1, and the positive label loss is greater than a negative label loss; and converging the predicted labels and the sample labels of the each target training image according to the cross-entropy loss function, and updating parameters of the model, to obtain a trained model.

An embodiment of the present disclosure provides a network device, including a processor and a memory connected to the processor, the memory storing machine-readable instructions, the machine-readable instructions being executable by the processor to perform: obtaining a multi-label image training set, the multi-label image training set comprising a plurality of training images, and each training image being annotated with a plurality of sample labels; selecting target training images from the multi-label image training set for training a current model; performing label prediction on each target training image by using the current model, to obtain a plurality of predicted labels of the each target training image; obtaining a cross-entropy loss function corresponding to the plurality of sample labels of the each target training image, a positive label loss in the cross-entropy loss function being provided with a weight greater than 1, and the positive label loss is greater than a negative label loss; and converging the predicted labels and the sample labels of the each target training image according to the cross-entropy loss function, and updating parameters of the current model, to obtain a trained model.

In addition, an embodiment of the present disclosure further provides a storage medium, storing a plurality of instructions, the instructions being configured to be loaded by a processor, to perform: obtaining a multi-label image training set, the multi-label image training set comprising a plurality of training images, and each training image being annotated with a plurality of sample labels; selecting target training images from the multi-label image training set for training a current model; performing label prediction on each target training image by using the current model, to obtain a plurality of predicted labels of the each target training image; obtaining a cross-entropy loss function corresponding to the plurality of sample labels of the each target training image, a positive label loss in the cross-entropy loss function being provided with a weight greater than 1, and the positive label loss is greater than a negative label loss; and converging the predicted labels and the sample labels of the each target training image according to the cross-entropy loss function, and updating parameters of the current model, to obtain a trained model.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

Figure 1A:
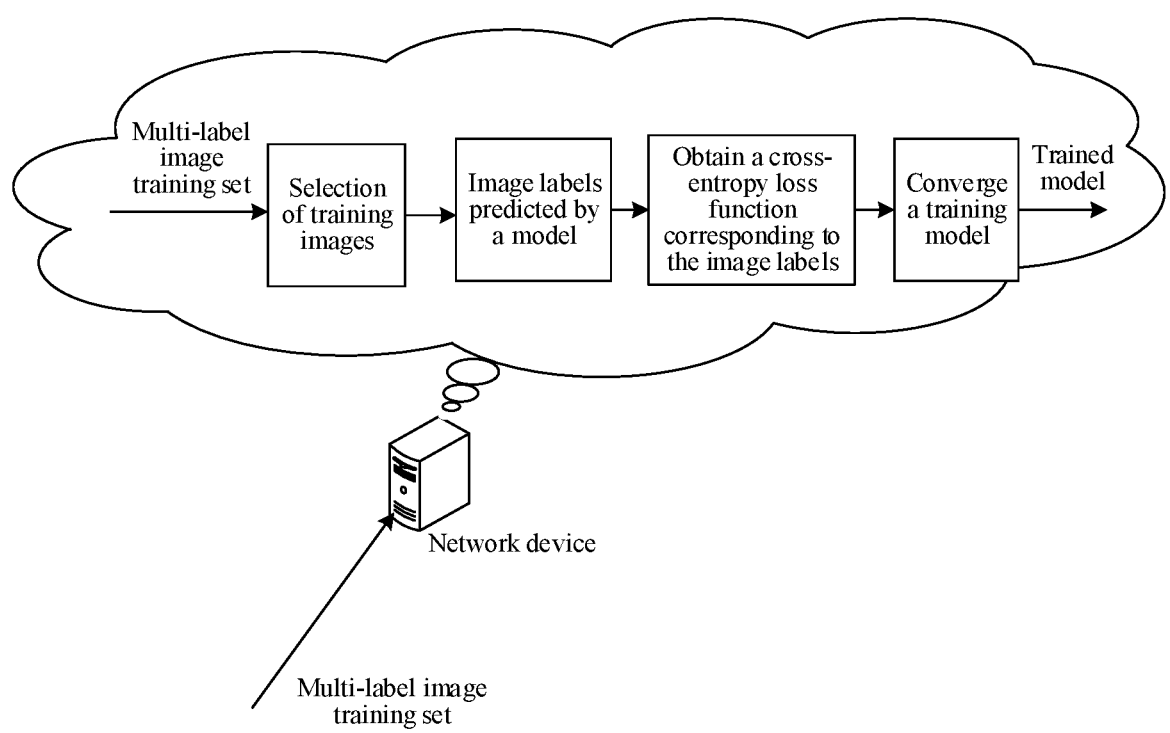
FIG. 1A is a schematic diagram of a scenario of a model training method according to an embodiment of the present disclosure.

The technical solutions in the embodiments of the present disclosure are clearly described in the following with reference to the accompanying drawings in the embodiments of the present disclosure. Apparently, the described embodiments are merely some embodiments of the present disclosure rather than all of the embodiments. All other embodiments obtained by a person skilled in the art based on the embodiments of the present disclosure without creative efforts shall fall within the protection scope of the present disclosure.

Currently, deep learning is one of technologies and research fields of machine learning. Artificial intelligence (AI) is implemented in a computer system by building an artificial neural network with a hierarchical structure.

The AI is a theory, method, technology and application system that uses a digital computer or a machine controlled by a digital computer to simulate, extend, expand human intelligence, perceive an environment, obtain knowledge, and use the knowledge to obtain an optimal result. In other words, the AI is a comprehensive technology of computer science, which attempts to understand the essence of intelligence and produces a new intelligent machine capable of responding in a manner similar to human intelligence. The AI is to study design principles and implementation methods of various intelligent machines, so that the machines have the functions of perception, reasoning, and decision-making.

The AI technology is a comprehensive discipline, covering a wide range of fields including a hardware-level technology and a software-level technology. A basic AI technology generally includes a technology such as a sensor, a dedicated AI chip, cloud computing, distributed storage, big data processing technologies, operation/interaction systems, mechatronics, or the like. An AI software technology mainly includes fields such as a computer vision technology, a speech processing technology, a natural language processing technology, machine learning/deep learning, and the like.

Due to successful application of deep learning (DL) in the vision field, researchers also introduce the DL to the field of image description, and a deep learning neural network model is trained by using a large-scale multi-label image data set, to complete tasks related to image recognition.

Currently, the large-scale multi-label image data set has a relatively severe problem of unbalanced classes, for example, unbalanced positive and negative labels in a class. For example, for a training image in the data set, generally, a quantity of negative labels (that is, classes do not exist in the image) is far greater than a quantity of positive labels (classes exist in the image). Because the large-scale multi-label image data set has the problem of unbalanced classes, the deep network model based on the large-scale multi-label image data set has relatively low accuracy and visual performance.

Embodiments of the present disclosure provide a model training method and apparatus for image recognition, and a storage medium.

The model training apparatus may be specifically integrated in a network device, for example, a device such as a terminal or a server. For example, referring to FIG. 1A, the network device may obtain a multi-label image training set. For example, the network device may search for multi-label images by using an image search engine, to obtain a multi-label image training set (the multi-label image training set includes images annotated with a plurality of labels). Then, a plurality of training images are selected from the multi-labeled image training set and used as target training images for training a current model. The current model is trained according to each target training image, to obtain a plurality of predicted labels of the each target training image. A cross-entropy loss function corresponding to the plurality of sample labels of the each target training image is obtained, a positive label loss in the cross-entropy loss function being provided with a weight, and the weight being greater than 1, so that the positive label loss is greater than a negative label loss. The predicted labels and the sample labels of the each target training image are converged according to the cross-entropy loss function, and parameters of the model are updated, to obtain a trained model. The current model may be a deep neural network model.

In some embodiments, although the current plurality of training images are selected from the multi-label image training set and used as the target training images for training the current model, during model training, the model learns the training images one by one. Therefore, the sample labels may be labels of a target training image currently learned by the model. For example, if the labels of the current target training image are "human" and "dog", the sample labels are "human" and "dog".

In some embodiments, the cross-entropy loss function is a manner used for measuring a predicted value and an actual value of an artificial neural network (ANN). The cross-entropy describes a distance between two probability distributions. That is, a smaller value of cross-entropy indicates a closer distance between the two probability distributions. Therefore, the distance between the predicted value and the actual value may be determined by using the value of the cross-entropy.

In some embodiments, the positive label loss in the cross-entropy loss function is provided with the weight, and the weight is greater than 1, so that the positive label loss is greater than the negative label loss, that is, a misclassification cost of a positive label is set to be greater than a misclassification cost of a negative label. A positive label may be a label the same as one sample label of the training image, for example, an object class existing in the image. A negative label may be a label different from the sample labels of the training image, for example, an object class not existing in the image.

In one embodiment of the present disclosure, the model may be trained in a batch training manner, that is, a plurality of training images are used each time for training the model.

In this case, the network device may select target training images used for current batch training from the multi-label image training set, and trains the deep neural network model according to the target training images.

In addition, to further suppress the problem of unbalanced positive and negative training images between classes, the network device may further adaptively attenuate a cross-entropy loss based on a situation that images having the labels occur successively in adjacent batch training. Specifically, the cross-entropy loss function further includes: a cross-entropy loss attenuation parameter. In this case, the network device may obtain a first training image overall type of each sample label in adjacent batch training, and the number of times that training images having labels the same as a sample label occur successively within the adjacent batch; obtain a second training image overall type of sample labels in the current batch training; update the cross-entropy loss attenuation parameter according to the first training image overall type, the second training image overall type, and the number of times, to obtain an updated cross-entropy loss function; and converge the predicted labels and the sample labels of the target training images according to the updated cross-entropy loss function.

In one embodiment of the present disclosure, the descriptions are made from the perspective of the model training apparatus, and the model training apparatus may be specifically integrated in the network device, for example, a device such as a terminal or a server.

Figure 1B:
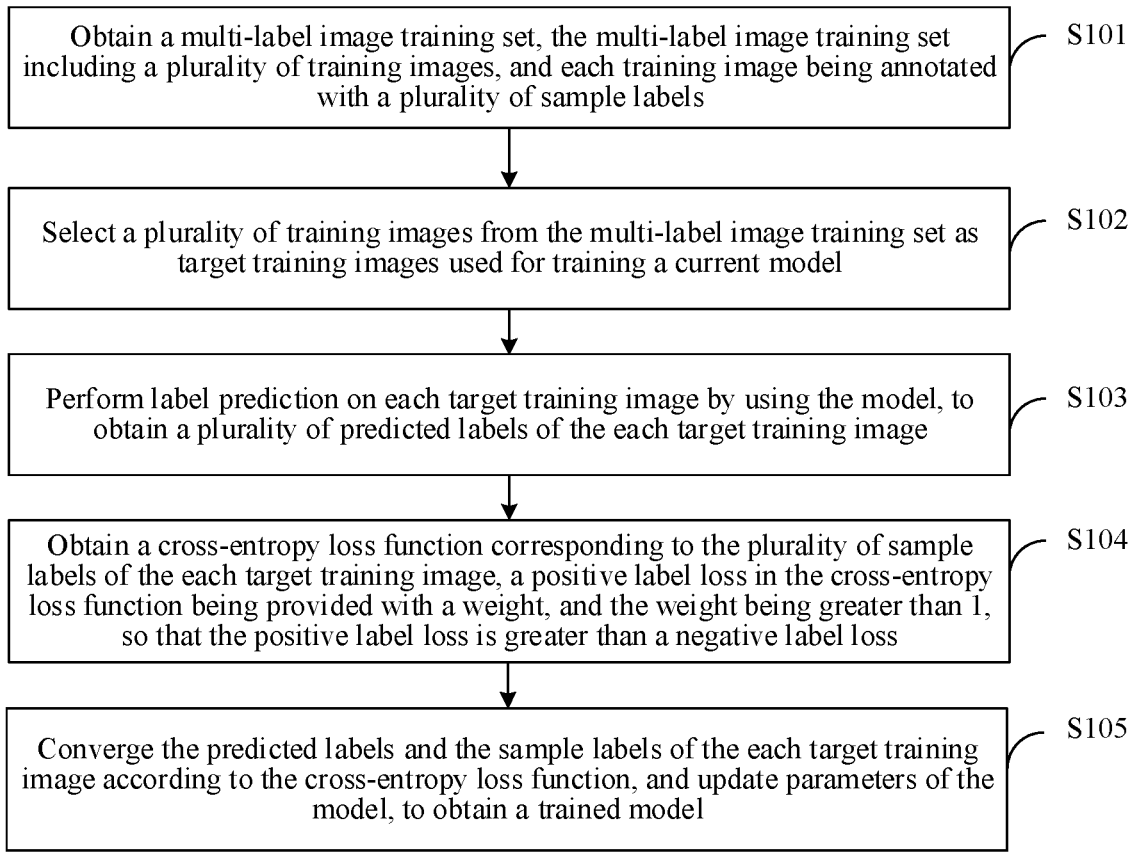
FIG. 1B is a schematic flowchart of a model training method according to an embodiment of the present disclosure.

In an embodiment, a model training method is provided. A deep neural network model obtained by using the model training method may be applied to tasks related to image recognition such as visual representation tasks, for example, image quality evaluation and recommendation of an article, and object recognition in a game. The method may be performed by the network device. As shown in FIG. 1B, a specific procedure of the model training method may include the following steps:

S101. Obtain a multi-label image training set, the multi-label image training set including a plurality of training images, and each training image being annotated with a plurality of sample labels.

The multi-label image training set may include at least one image annotated with a plurality of labels (for example, a plurality of object classes). The image may be referred to as a multi-label image. The multi-label image training set may include a plurality of multi-label images, and contains a plurality of object classes.

In an actual application, the multi-label image training set may be a large-scale multi-label image training set that has been made public in the art. For example, the large-scale multi-label image training set may be an Open Images v3 multi-label image training set (including 9 million images, and containing 6 thousand object classes), or may be an ML-Images large-scale multi-label image training set, which contains a total of 11166 labels and 18019881 images.

In one embodiment of the present disclosure, there may be a plurality of manners of obtaining a multi-label image training set. For example, public multi-label images may be searched for by using an image search engine and the like, to form the multi-label image training set. In another example, a multi-label image training set that has been made public, such as ML-Images, may be downloaded or pulled directly.

In one embodiment of the present disclosure, label content of an image may include a class to which the image belongs (which may be an object class), for example, a class number and/or a class name. For example, the label may include a class number/m/056mk, and a corresponding class name metropolis (that is, a city or a metropolis)

S102. Select a plurality of training images from the multi-label image training set as target training images used for training a current model.

For example, one or more training images may be selected from the multi-labeled image training set for model training.

In an embodiment, a plurality of batches of training images may be used for training the model, and specifically, target training images of different batches may be used for implementing batch training. That is, a plurality of target training images used for model training may be selected from the multi-labeled image training set each time. For example, the step of selecting a plurality of training images from the multi-label image training set may include: selecting the plurality of training images from the multi-label image training set as the target training images in the current batch training.

For example, 100 training images may be selected each time as the target training images, to perform batch training on the model.

In an actual application, the quantity of training images selected for each batch, that is, each batch training, may be the same, such as 100, or may be different. For example, 100 training images are selected for the first time, and 200 training images are selected for the second time.

In an embodiment, to improve the efficiency and accuracy of model training, the training images may be further preprocessed before the model training. For example, before label prediction is performed on the target training images by using a deep neural network model, the method may further include: preprocessing the target training images.

Figure 1C:
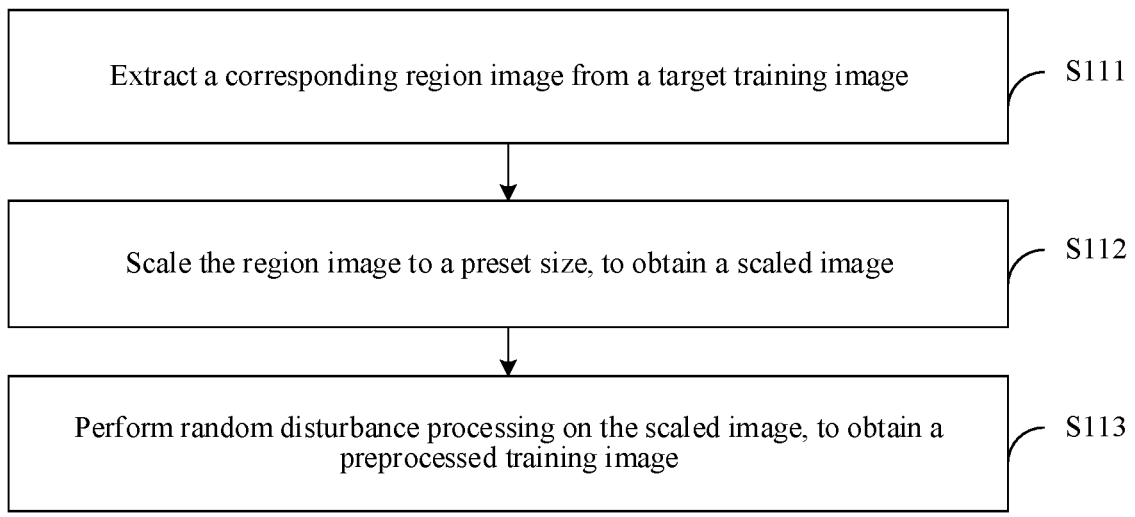
FIG. 1C is a flowchart of preprocessing a target training image according to an embodiment of the present disclosure.

FIG. 1C is a flowchart of preprocessing a target training image according to an embodiment of the present disclosure. As shown in FIG. 1C, the preprocessing process may include the following steps:

S111. Extract a corresponding regional image from the target training image.

Specifically, a regional image that occupies a predetermined ratio of the target training image and has a width-height ratio being a predetermined ratio may be extracted from the target training image.

In an embodiment of the present disclosure, the predetermined ratio may be a value randomly selected from a predetermined ratio range, and/or, the predetermined ratio may be a value randomly selected from a predetermined width-height ratio range. For example, the predetermined ratio range may be [0.7, 1.0], and the predetermined width-height ratio range may be [3/4, 4/3].

S112. Scale the regional image to a preset size, to obtain a scaled image.

The predetermined size may be set according to actual requirements. For example, the extracted regional image is uniformly scaled to a size of 224*224.

S113. Perform random disturbance processing on the scaled image, to obtain a preprocessed training image.

The random disturbance processing may include:
performing horizontal flip processing on the scaled image according to a first processing probability; and/or
performing rotation processing with a random angle on the scaled image according to a second processing probability, the random angle being an angle randomly selected from a predetermined angle range; and/or
performing disturbance processing on attributes of the scaled image according to a third processing probability; and/or scaling a pixel value of the scaled image to a preset pixel value range.

The attributes of the image include: saturation, contrast, brightness, chrominance, and the like. The preset pixel value range may be [−1, 1]. The processing probabilities may be set according to actual requirements. The predetermined angle range may be set according to actual requirements, for example, may be set between [−45, 45] degrees.

For example, for a target training image, the image may be an RGB image. A preprocessing process may be as follows:
(1) randomly clipping, from the image, a region that accounts for a ratio of [0.7, 1.0] to a total area of the image and that has a width-height ratio of [3/4, 4/3];
(2) adjusting a size of the clipped image to a size of 224*224;
(3) performing horizontal flip processing on the image according to the first processing probability, for example, a processing probability of 0.5;
(4) performing rotation processing with a random angle on the image according to the second processing probability, for example, a processing probability of 0.25, the random angle being randomly determined between [−45, 45] degrees;
(5) performing disturbance processing on the saturation, the contrast, the brightness and the chrominance of the image according to the third processing probability, for example, a processing probability of 0.5; and
(6) scaling the pixel value of the pixel point in the image into a range of [−1, 1]. For example, when the image is binarized, the pixel value may be scaled from [0, 1] to [−1, 1].

S103. Perform label prediction on each target training image by using the model, to obtain a plurality of predicted labels of the each target training image.

For example, the model may be a deep neural network model. When the labels include image classes, the each target training image may be classified by using the deep neural network model, to obtain predicted classes of the each target training image, that is, the predicted labels.

In an embodiment, after the each target training image is preprocessed, the "performing label prediction on each target training image by using the model" may include: performing label prediction on each preprocessed target training image by using the model.

The deep neural network model may include an output layer, and the output layer may include a plurality of output functions. Each output function is used for outputting a prediction result of a corresponding label such as a class, for example, a predicted label, and a prediction probability corresponding to the prediction label.

For example, the output layer of the deep network model may include m output functions such as Sigmoid functions, and m is the quantity of labels corresponding to the multi-label image training set. For example, when the labels are classes, m is the quantity of classes of the multi-label image training set, and m is a positive integer. An output of each output function such as the Sigmoid function may include that a given training image belongs to a specific label, such as an object class, and/or a probability value, that is, a prediction probability.

The deep neural network model may be a model based on a deep learning network such as a convolutional neural network, for example, a residual neural network (ResNet) model. The ResNet is a neural network proposed by He Kaiming et al. A structure of the ResNet may greatly accelerate the training of an ultra-deep neural network, and the accuracy of the model is also greatly improved.

In an embodiment, in an original residual network structure, a first convolutional layer in a convolution branch has a convolution kernel size of 1×1 and a convolution step size of 2, a second convolutional layer has a convolution kernel size of 3×3 and a convolution step size of 1. In this case, when a convolution operation is performed on the first convolutional layer, one feature point is skipped between two convolution processes, causing a loss to a feature network. Therefore, the structure of the residual network may be improved as follows:

The residual network includes a plurality of residual blocks that are sequentially connected, each residual block includes a convolution branch and a residual branch. A convolution kernel size of a first convolutional layer in the convolution branch is less than a convolution kernel size of a second convolutional layer following the first convolutional layer, and a convolution step size of the second convolutional layer is greater than a convolution step size of the first convolutional layer and less than a convolution kernel width of the second convolutional layer. The residual branch in the residual block points from an input of the convolution branch to an output of the convolution branch.

In an embodiment, the residual network may be a deep residual network. The residual network further includes an initial convolutional layer in front of the plurality of residual blocks, an output of the initial convolutional layer is used as an input of the first residual block in the plurality of residual blocks. In one embodiment, because the second convolutional layer in the residual block may implement downsampling processing already, a pooling layer in front of the residual block in the original residual network may be removed, thereby simplifying the structure of the residual network.

In an embodiment of the present disclosure, the plurality of residual blocks in the residual network constitute a plurality of convolution stages, and a residual branch included in the first residual block in each convolution stage includes a batch normalization processing layer and a target convolutional layer that are sequentially connected.

In one embodiment, for a residual block, if an input and an output of the residual block have the same size (including size, channel, and the like), the residual branch is identity mapping. If the input and the output of the residual block have different sizes, a convolution operation needs to be performed to map the input and output to the same size. Generally, in the first residual block in the each convolution stage, a residual branch of non-identical mapping (that is, one convolutional layer is added) needs to be used to ensure consistency between the input and the output of the residual block. In addition, because the convolution operation of the convolutional layer does not have a bias term, a batch normalization (BN) layer may be added before the convolutional layer to add the bias term, thereby achieving an optimal processing effect.

The structure of the residual network may ensure that downsampling processing can be implemented through the second convolutional layer when the convolution operation is performed in the convolutional layer in the residual block, and also ensure that no feature point is skipped, thus ensuring zero loss of a feature network representation ability. Therefore, accuracy of image feature extraction is ensured, and accuracy of image recognition is improved.

Figure 2:
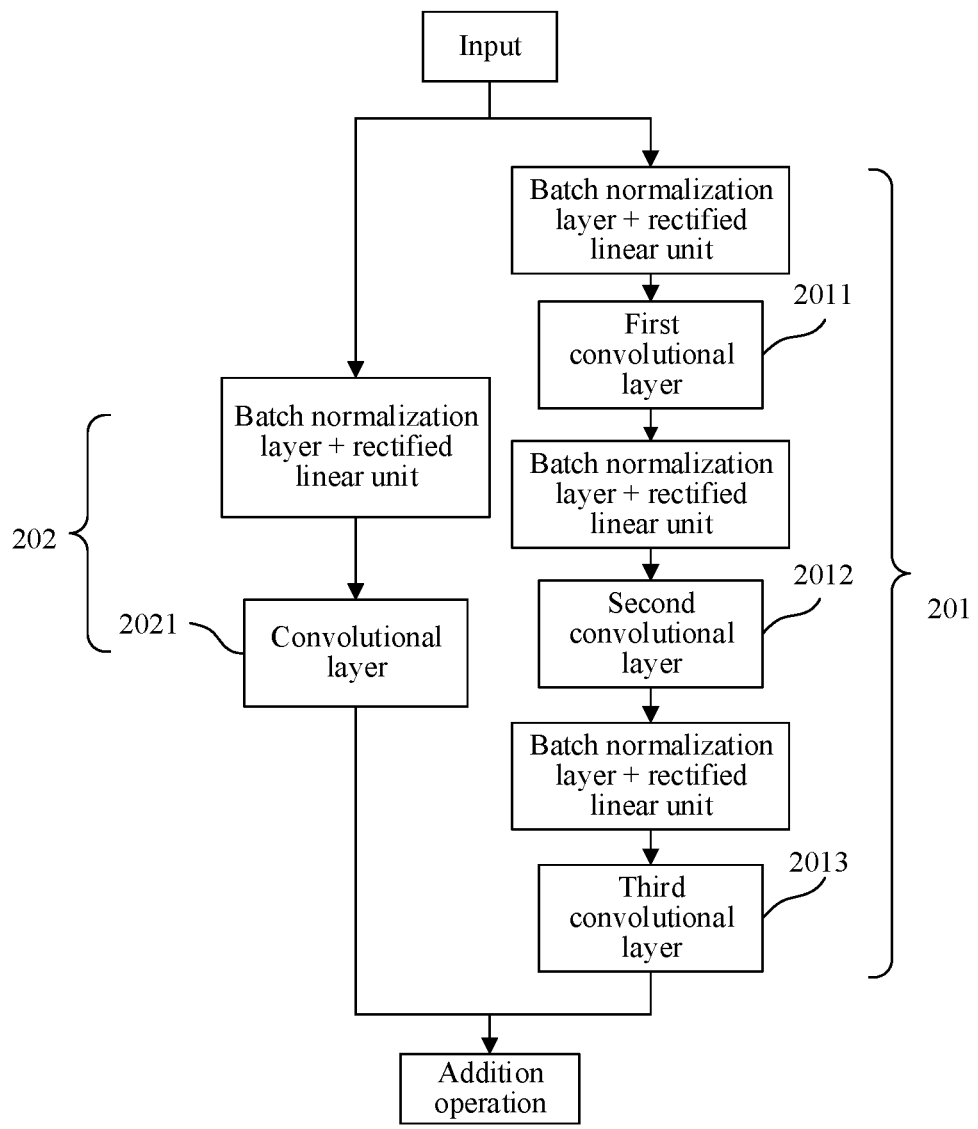
FIG. 2 is a schematic structural diagram of the first residual block in each convolution stage of a residual network according to an embodiment of the present disclosure.

Based on the structure of the residual network described in the foregoing embodiments, in a specific embodiment of the present disclosure, FIG. 2 is a schematic structural diagram of the first residual block in each convolution stage of a residual network according to an embodiment of the present disclosure. The first residual block specifically includes: a convolution branch 201 and a residual branch 202. The residual branch 202 points from an input of the convolution branch 201 to an output of the convolution branch 201.

The convolution branch 201 includes a first convolutional layer 2011, a second convolutional layer 2012, and a third convolutional layer 2013. A BN layer is disposed before each of the first convolutional layer 2011, the second convolutional layer 2012, and the third convolutional layer 2013, and after processing by the BN layer, processing is performed by a rectified linear unit (Relu). The first convolutional layer 2011 has a convolution kernel size of 1×1 and a convolution step size of 1. The second convolutional layer 2012 has a convolution kernel size of 3×3 and a convolution step size of 2. The third convolutional layer 2013 has a convolution kernel size of 1×1 and a convolution step size of 1. Because the second convolutional layer 2012 not only can implement the downsampling processing, but also can ensure that no feature point is skipped, the residual block in one embodiment of the present disclosure can ensure zero loss of the feature network representation ability.

The residual branch 202 includes a convolutional layer 2021 and the BN layer disposed before the convolutional layer, and after processing by the BN layer, processing is performed by a Relu function.

An element-level addition operation is performed on the outputs of the convolution branch 201 and the residual branch 202, to obtain an output of each residual block.

Figure 3:
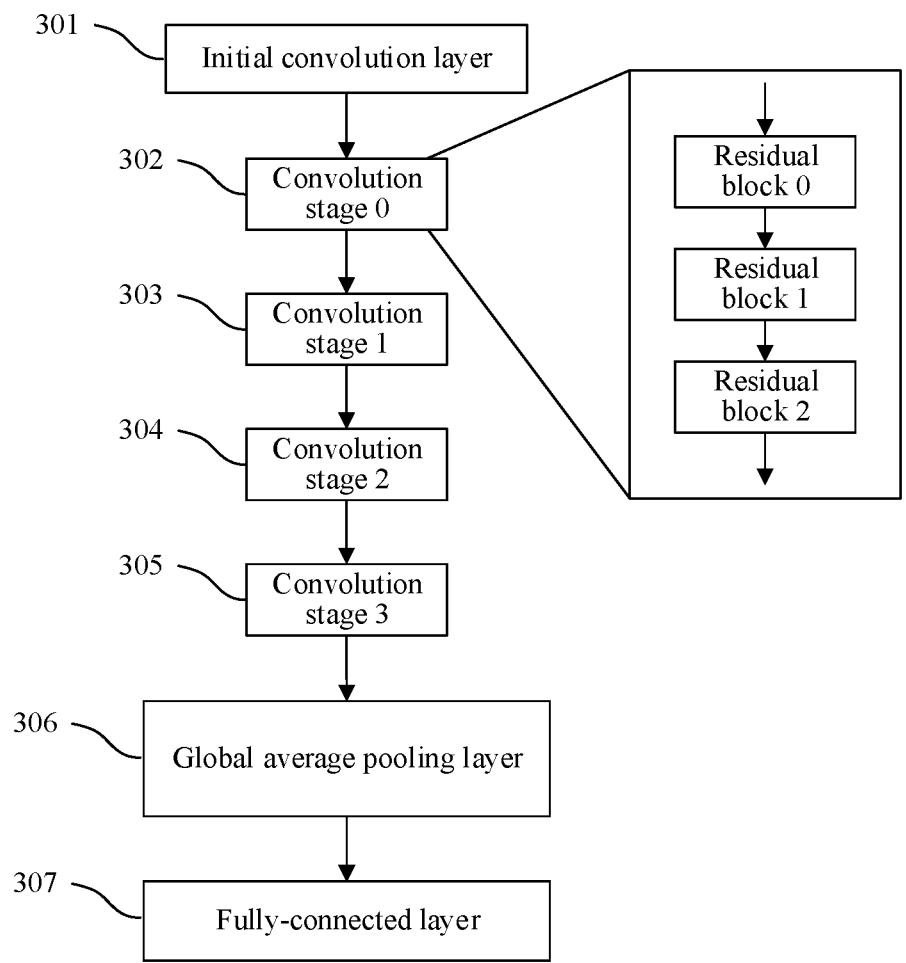
FIG. 3 is a schematic structural diagram of a residual network according to an embodiment of the present disclosure.

In an embodiment of the present disclosure, FIG. 3 is a schematic structural diagram of a residual network according to an embodiment of the present disclosure. The structure includes: an initial convolution layer 301, a convolution stage 302, a convolution stage 303, a convolution stage 304, a convolution stage 305, a global average pooling layer 306, and a fully-connected layer 307 that are sequentially connected. The initial convolutional layer 301 has a convolution kernel size of 7×7, a convolution step size of 2, and a channel quantity of 64. Each of the convolution stage 302, the convolution stage 303, the convolution stage 304, and the convolution stage 305 includes a plurality of residual blocks, and different convolution stages may include different quantities of residual blocks. For example, in a ResNet 101, the convolution stage 302 includes 3 residual blocks, the convolution stage 303 includes 4 residual blocks, the convolution stage 304 includes 23 residual blocks, and the convolution stage 305 includes 4 residual blocks. The structure of the first residual block in the each convolution stage is shown in FIG. 2. The residual branches in other residual blocks are identity mapping, and the convolution branches in other residual blocks are the same as the convolution branch 201 shown in FIG. 2.

It can be seen from the structures of the residual network shown in FIG. 2 and FIG. 3 that, in the residual network in one embodiment of the present disclosure, based on the original residual network, a maximum pooling layer following the initial convolutional layer 301 is removed, and the downsampling process is placed in the first convolution stage, that is, the convolution stage 302, and is specifically placed in the second convolutional layer 2012 in the first residual block in the convolution stage 302. In addition, in each residual block, the downsampling process is placed in the second convolutional layer having the convolution kernel size of 3×3, so that the downsampling process does not skip any feature point, and no feature network representation ability is lost. In addition, the BN layer is not only added to the convolution branch, but also added to the residual branch of the non-identity mapping. In this way, the bias term may be added in front of the convolutional layer through the BN layer, thereby achieving the optimal processing effect.

According to the foregoing description, in an actual application, the structure of the residual network is mainly improved as follows:
removing an initial Max Pooling operation, and placing the downsampling to the first stages; and
replacing blocks having a convolution step size of 2, and placing the downsampling to a convolution operation having a convolution kernel size of 3*3.

The BN operation is not only performed on the convolution branch of each block, but also performed on the residual branch of the non-identity mapping.

In an embodiment, positive and negative training images between labels, such as classes, are unbalanced. For example, for most classes, within a range of an entire data set, positive images are generally fewer than negative images. In particular, for some rare small classes, there are often only thousands of positive images, and a ratio of positive images to negative images even reaches 1 to several thousand.

In some embodiments, for a sample label of the target training images, a positive image is an image including content corresponding to the sample label such as a class, and a negative image is an image not including the content corresponding to the sample label such as the class. For example, when the sample label is "dog", the positive image refers to an image including a dog, and the negative image refers to an image not including a dog.

In some embodiments, for a sample label of the target training images, the positive training image is training image that includes content corresponding to the sample label in the target training images used for model training, that is, the positive training image refers to a training image having a label the same as the sample label. The negative training image is a training image that does not include the content corresponding to the sample label in the target training images used for model training, that is, the negative training image refers to a training image whose labels are all different from the sample label. For example, a total of 10000 target training images are selected the multi-label image training set for model training. When the sample label is "dog", the positive training image refers to a training image including a dog in the target training images, and the negative image refers to a training image not including a dog in the target training images.

Therefore, to suppress unbalanced positive and negative training images between labels such as classes, and improve the model accuracy and visual performance, a downsampling operation and the like may be further performed on negative training images in a negative sample set. Downsampling, as used herein, may refer to reduce a number of sample images having a certain sample label used in training. That is, downsampling on the negative training images may refer to, reduce the number of training images whose sample label of a specific class is negative inputted into the neural network model. For example, when the deep neural network model includes an output layer, and the output layer includes a plurality of output functions, step S103 of "performing label prediction on each target training image by using the model, to obtain a plurality of predicted labels of the each target training image" may include:
for each sample label of the each target training image, updating, according to a preset processing probability, a parameter in an output function corresponding to the sample label when the target training images are all negative training images without the sample label, to obtain an updated model.

In some embodiments, for a sample label of the target training images, when none of the target training images includes the sample label, that is, when all the target training images are negative training images, the parameter of the output function corresponding to the sample label is updated according to the preset processing probability, for example, a processing probability of 0.1.

The label prediction is performed on the each target training image by using the updated model, to obtain the plurality of predicted labels of the each target training image.

Alternatively, the step of "performing label prediction on each target training image by using the model, to obtain a plurality of predicted labels of the each target training image" may include:

for each sample label of the each target training image, randomly downsampling negative training images without the sample label in the target training images when a positive training image with the sample label exists in the target training images, to obtain downsampled target training images; and performing label prediction on the downsampled target training images by using the model, to obtain the plurality of prediction labels of the each target training image.

The positive training image is a training image having a label (for example, class) the same as the sample label, and the negative training image is a training image without a label (for example, class) the same as the sample label.

In an embodiment, the step of "randomly downsampling negative training images without the sample label in the target training images" may include:

randomly downsampling the negative training images without the sample label in the target training images according to a preset positive-negative training image ratio corresponding to the sample label.

The positive-negative training image ratio of a label (for example, class) may be a ratio of the quantity of positive training images to the quantity of negative training images of the label (for example, the class). The ratio may be set according to actual requirements.

For example, the negative training images of the sample label in the target training images may be randomly downsampled (i.e., randomly discarding some of the negative training images of this sample label), so that a positive-negative training ratio is not less than the preset positive-negative training image ratio, for example, not less than a preset ratio of 1:5 (i.e., the ratio between the number of positive training images of this sample label and the number of negative training images of this sample label is not less than 1:5).

For example, in an actual application, in each batch of training images, for each class, most of the training images are negative, that is, the class does not exist in the training images, and even all training images are negative for the class. To suppress the data unbalance, the following measures may be used according to the foregoing description:

a) If all training images of the current batch are negative for a specific class, that is, none of the training images of the current batch training includes content corresponding to the class, parameters of the Sigmoid function corresponding to the class are updated according to the preset processing probability of 0.1.

b) If there are positive training images, negative training images are randomly downsampled, so that a ratio of positive training images to negative training images is not less than 1:5.

Therefore, although the quantities of positive training images corresponding to different classes are unbalanced, the downsampling of the negative training images ensures that training corresponding to all the classes is performed under approximate positive-negative data distributions, and the unbalance between classes is relieved to some extent, thereby improving the accuracy and visual performance of the model.

S104. Obtain a cross-entropy loss function corresponding to the plurality of sample labels of the each target training image, a positive label loss in the cross-entropy loss function being provided with a weight, and the weight being greater than 1, so that the positive label loss is greater than a negative label loss.

The target training image generally has a plurality of sample labels, and the cross-entropy loss function contains the plurality of sample labels. Obtaining timing of the cross-entropy loss function is not limited by a sequence number, and a corresponding timing position in the model training process may be set according to actual requirements. For example, after the training images are selected, the cross-entropy loss function corresponding to the plurality of sample labels may be obtained.

The positive label is a label the same as the sample label of the training image. For example, when the label is a class j, the positive label is a class the same as the class j of the training image. The negative label is a label different from the sample label of the training image. For example, when the label is the class j, the negative label is a class different from the class j of the training image.

In one embodiment of the present disclosure, the cross-entropy loss function may include the positive label loss and the negative label loss, and the positive label loss and the negative label loss may be obtained based on the label prediction probability and the sample label of the training image.

For each type of sample label of the training image such as an $i^{th}$ training image $x_i$, the cross-entropy function corresponding to the sample label may be used for convergence in one embodiment of the present disclosure. For example, if the labels are object classes, a definition of the cross-entropy loss function containing m sample labels may be as follows:

$$\mathcal{L}_W(x_i, y_i) = \frac{1}{m}\sum_{j}^{m} r_t^i[-\eta y_{ij}\log(p_{ij}) - (1 - y_{ij})\log(1 - p_{ij})]$$

$p_{ij}=f_W(x_i, j)\in[0, 1]$ represents a posteriori probability, that is, a prediction probability, for $j^{th}$ class. W represents a set of trainable parameters of the model. $y_i\in\{0, 1\}^m$ represents a given label vector of an $i^{th}$ training image $x_i$ (that is, a sample label set of the $i^{th}$ training image $x_i$). If $j^{th}$ object exists in the image, a $j^{th}$ element of $y_i$ is 1; otherwise, the $j^{th}$ element of $y_i$ is 0. m is the quantity of label types of the multi-label image training set, that is, the quantity of classes.

$\eta$ is a weight parameter of the positive label loss, and a value of $\eta$ represents a weight of the positive label loss. The function of the weigh parameter $\eta>1$ is to make the positive label loss greater than the negative label loss, to specify that a misclassification cost of a positive label (that is, an object class existing in the image) is greater than that of a negative label (that is, an object class noting exist in the image). The reason for this is that: a) For image annotation, prediction accuracy of positive labels is more appreciated; b) the quantity of negative labels is far greater than that of positive labels, and η>1 can suppress the unbalance to some extent; and c) reliability of positive labels is greater than that of negative labels, because there are many missing positive labels in the negative labels. In an actual application, η is preferably set to 12, to suppress the unbalance between positive and negative labels within the class.

In an embodiment, the unbalance of positive images between labels, for example, between classes, is further considered. The quantities of positive images corresponding to different classes differ greatly. For some common main classes (such as animals and plants), a proportion of positive images in the entire data set may be greater than 10%. For some rare small classes, a proportion of positive images may be one thousandth. This reduces the accuracy and visual performance of the model in training.

To further suppress the unbalance of images between labels such as classes, and improve the model accuracy and visual performance, adaptive attenuation may be performed on cross-entropy losses of specific labels such as classes in one embodiment of the present disclosure. For example, a cross-entropy loss attenuation parameter may be added to the cross-entropy loss function, to attenuate the cross-entropy loss of a corresponding class. Referring to the cross-entropy loss function, rtj is the cross-entropy loss attenuation parameter.

In an actual application, during batch training each time, the cross-entropy loss attenuation parameter may be updated, to adaptively attenuate the cross-entropy loss of the class. Specifically, in an embodiment, before the predicted labels and the sample labels of the each target training image are converged according to the cross-entropy loss function, the method in one embodiment of the present disclosure may further include:

obtaining a first training image overall type corresponding to each sample label of target training images of an adjacent batch, and the number of times that training images having labels the same as the sample label occur successively, the first training image overall type corresponding to the sample label being used for indicating whether one or more successive training images having labels the same as the sample label exist in the target training images of the adjacent batch;

obtaining a second training image overall type corresponding to each sample label of target training images of a current batch, the second training image overall type corresponding to the each sample label being used for indicating whether one or more successive training images having labels the same as the sample label exist in the target training images of the current batch; and updating the cross-entropy loss attenuation parameter according to the first training image overall type, the second training image overall type and the number of times, to obtain an updated cross-entropy loss function.

In some embodiments, the adjacent batch refers to adjacent batch training, and the current batch refers to current batch training.

In some embodiments, if one or more successive training images in the target training images of the adjacent batch have a label the same as the sample label, the first training image overall type is positive for the sample label. If none of the target training images of the adjacent batch training has a label the same as the sample label, the first training image overall type is negative for the sample label.

In some embodiments, if the target training images of the current batch include one or more successive training images that have a label the same as the sample label, the second training image overall type is positive for the sample label. If none of the target training images of the current batch has a label the same as the sample label, the second training image overall type is negative for the sample label.

For example, 10,000 target training images are selected from the multi-label image training set for model training, and sample labels of currently learned target training images are "human" and "dog". For ease of example without loss of generality, if there are five target training images of the adjacent batch, the first training image overall type for the sample label "human" is used for indicating a result that each of the five target training images of the adjacent batch has or does not have the label "human". For example, if the training image has the label "human", a type identifier of the training image is 1, and if the training image does not have the label "human", the type identifier of the training image is 0. If one or more of the five target training images of the adjacent batch have the label "human", for example, if type identifiers of the five target training images of the adjacent batch are 01110, the first training image overall type is "positive" for the sample label "human". If none of the five target training images of the adjacent batch has the label "human", for example, if type identifiers of the five target training images of the adjacent batch are 00000, the first training image overall type is "negative" for the sample label "human"

Similarly, the second training image overall type is used for indicating whether one or more successive training images having labels the same as the sample label exist in the target training images of the current batch, and a method for determining the second training image overall type is the same as the method for determining the first training image overall type. Details are not described herein again.

During collection of statistics about the number of times that training images having labels the same as the sample label occur successively, the first training image overall type, and the second training image overall type, statistics need to be respectively collected for each sample label. For example, when the sample labels are "human" and "dog", the number of times that training images having the label "human" occur successively needs to be counted for the sample label "human" and the number of times that training images having the label "dog" occur successively needs to be counted for the sample label "dog".

The overall training image type may be an overall training image type of a specific label, such as a class, in training images of batch training, and the overall training image type may be positive or negative. For example, the training image overall type may be an overall training image class corresponding to the object class j in the batch training images.

That is, the overall training image type is a symbol of a specific label, such as a class, in the training images of batch training, and may be positive or negative.

For example, if the object class is j, in specific batch training, a plurality of training images, that is, batch training images, may be obtained. If one or more successive training images of the class j occur in the training images, it is determined that the training image overall type of the object class j is positive, that is, a symbol of j is positive. If none of classes of the training images is the class j, it may be determined that the training image overall type of the object class j is negative, that is, the symbol is negative.

The number of times that training images having a sample label occur successively is the number of times that training images corresponding to the sample label (non-sample label) in batch training images occur successively currently, that is, the number of times that positive (negative) training images in batch training images occur successively for a specific label. For example, classes of batch training images are j, j+1, j, j, j, j+1, j, j, j, j, j and j sequentially, and in this case, the number of times that the positive training images of the class j occur successively in the batch training is 6 currently.

The adjacent batch training is batch training adjacent to the current batch training, for example, previous batch training of the current batch training, that is, a previous batch.

In one embodiment of the present disclosure, the training image overall type of the sample label, such as the class, in the current batch of training images (that is, the training images of the current batch), the training image overall type of the sample label, such as the class, in the adjacent batch of training images, and the number of times that the positive (negative) training images of the sample label, such as the class, occur successively may be obtained. Then, the cross-entropy loss attenuation parameter such as rtj is updated based on the image overall types and the number of times.

For example, in the cross-entropy loss function, a cross-entropy loss adaptive attenuation parameter (also referred to as an adaptive weight parameter of the cross-entropy loss) $r_t^j = 0.9^{t-1}$ is added, where t represents the number of times that the positive (negative) samples of the class j occur successively in the current batch of training images. It can be learned from the formula that, a value of the cross-entropy loss adaptive parameter may be obtained through t, that is, the cross-entropy loss adaptive parameter is updated through t.

Therefore, to obtain the cross-entropy loss adaptive parameter, it is necessary to first obtain the number of times that the positive (negative) samples of the class j occur successively in the current batch of training images, that is, t. In an actual application, t is related to the training image overall types of the current batch training and the adjacent batch training. Specifically, the step of "updating the cross-entropy loss attenuation parameter according to the first training image overall type, the second training image overall type and the number of times, to obtain an updated cross-entropy loss function" may include:

comparing the first training image overall type with the second training image overall type, to obtain a comparison result;

obtaining, according to the comparison result and the number of times, a target number of times that current training images having the sample label occur successively in current batch training; and updating the cross-entropy loss attenuation parameter according to the target number of times, to obtain an updated cross-entropy loss function.

The target number of times is t, and may be obtained based on the comparison result of the image overall types of the current batch training and adjacent historical batch training, and the number of times that positive (negative) training images of the sample label occur successively in the adjacent historical batch training.

For example, when the first training image overall type and the second training image overall type are consistent, for example, both symbols are positive, the number of times that the positive (negative) training images of the sample label occur successively in the adjacent historical batch training may be increased by 1, to obtain the number of times that the positive (negative) training images of the sample label occur successively in the current batch training. That is, t=t+1. When the first training image overall type and the second training image overall type are inconsistent, for example, one symbol is positive and another symbol is negative, the number of times that the positive (negative) training images of the sample label occur successively in the current batch training is equal to 1. That is, t=1.

For example, according to the foregoing description, for the class j, if positive samples occur successively or no positive samples (all samples are negative samples) occur successively in the adjacent batch of training images, the cross-entropy loss is adaptively attenuated. In the foregoing loss function, an adaptive weight parameter $r_t^j = 0.9^{t-1}$ is added, to implement adaptive attenuation of the cross-entropy loss, where t represents the number of times that positive (negative) samples occur successively.

In an actual application, for a common large class, it is more probable that positive samples occur successively. For a rare small class, it is more probable that all samples are negative samples in succession. Therefore, by adaptively attenuating the cross-entropy loss of a corresponding label such as a class, over-fitting of the model to a large class (an update based on positive samples) can be weakened, and suppression over a small class (an update based on negative samples) by the model can be weakened, to suppress the unbalance between classes, so as to improve the accuracy and the visual performance of the model.

S105. Converge the predicted labels and the sample labels of the each target training image according to the cross-entropy loss function, and update parameters of the model, to obtain a trained model.

For example, for each sample label, such as a class, of the training sample, the cross-entropy loss function corresponding to the sample label may be obtained. Then, the predicted labels and the sample labels of the training image are converged based on the cross-entropy loss function, to train the model parameters of the model, and obtain the trained model.

Specifically, in an embodiment, a cross-entropy loss of the predicted labels and the sample labels of the training image is obtained according to the cross-entropy loss function. The model parameters in the deep neural network model are trained according to the cross-entropy loss.

In one embodiment of the present disclosure, the model may be trained by using a back propagation algorithm together with a stochastic gradient descent algorithm with momentum. For example, a cross-entropy loss descent gradient (which may be obtained by deriving the loss function) of the predicted labels and the sample labels of the training image may be obtained according to the cross-entropy loss function. Then, the model parameters in the deep neural network model are trained based on the cross-entropy loss descending gradient. Specifically, the model parameters may be updated based on the cross-entropy loss descent gradient and a learning rate corresponding to the model parameters (that is, a learning rate corresponding to a layer in which the model parameters are located).

In an embodiment, after the deep neural network model is trained in the foregoing manner, a deep neural network model with a multi-label prediction or output may be changed to a classification model with a single-label prediction or output through transfer learning, thereby improving the universality of the model. For example, the method in one embodiment of the present disclosure may further include:

replacing a plurality of output functions in an output layer of the trained deep neural network model with single-label classifiers, to obtain a changed network model for each sample label;

performing adaptive adjustment on a learning rate of each layer in the changed network model according to a principle that a learning rate of a higher layer is greater than a learning rate of a lower layer, to obtain an adjusted network model; and training parameters of the adjusted network model according to a single-label training image set, to obtain a single-label image classification model.

By using the foregoing method, transfer learning may be performed on the ResNet-101 model with a multi-label output trained on the multi-label image training set ML-Images, so that the ResNet-101 model with a multi-label output trained on ML-Images can help other visual tasks such as single-label image classification.

Specifically, output layers (that is, a plurality of independent Sigmoid functions) of the ResNet-101 model with a multi-label output trained on ML-Images may be replaced with a single-label classifier (that is, a single Softmax function). Then, hierarchical adaptive learning rate fine-tuning is performed on the learning rate of each layer in the changed network model. Next, model parameters of the adjusted network model are trained on the single-label training image set such as an ImageNet data set, to obtain a single-label image classification model. The model parameters include: parameters of the single-label classifier (that is, the single Softmax function), other model parameters, and the like.

The method of hierarchical adaptive learning rate fine-tuning is performing adaptive adjustment on the learning rate of each layer in the changed network model according to a principle that the learning rate of the higher layer is greater than the learning rate of the lower layer. Specifically, the learning rate of the higher layer is set to be greater than that of the lower layer. That is, a layer closer to the output has a higher learning rate.

Compared with the single-label classification model obtained in a traditional manner, the single-label classification model obtained through transfer learning relieves a negative effect caused by the difference between the multi-label data set and the single-label data set, and has advantages of excellent performance, high classification precision, high quality, and the like.

The model training method provided in one embodiment of the present disclosure may be applied to vision-related services, for example, article image quality evaluation and recommendation, and object recognition in a game. All models trained by using the method of the embodiments of the present disclosure achieve good effects. In addition, the model further provides an excellent initial model for other more general visual services, including image understanding, video understanding, and the like.

It can be learned from the above that, in one embodiment of the present disclosure, a multi-label image training set may be obtained, the multi-label image training set including a plurality of training labels, and each training image being annotated with a plurality of sample labels; a plurality of training images are selected from the multi-label image training set and used as target training images used for training a current model; label prediction is performed on each target training image by using the model, to obtain a plurality of predicted labels of the each target training image; a cross-entropy loss function corresponding to the plurality of sample labels of the each target training image is obtained, a positive label loss in the cross-entropy loss function being provided with a weight, and the weight being greater than 1, so that the positive label loss is greater than a negative label loss; and the predicted labels and the sample labels of the each target training image are converged according to the cross-entropy loss function, and parameters of the model are updated, to obtain a trained model. In this solution, the cross-entropy loss function with the weight may be used for training the model parameters of the deep neural network model, and the value of the weight parameter in the cross-entropy function is greater than 1, so that the problem of unbalanced positive and negative labels between classes can be suppressed, and the accuracy and the visual performance of the model are improved.

In addition, in this solution, the problem of class unbalance may be further suppressed through adaptive attenuation of the cross-entropy loss and downsampling of negative samples, to further improve the accuracy and the visual performance of the model.

According to the method described in the foregoing embodiments, the following further provides detailed descriptions by using an example.

In one embodiment, an example in which the model training apparatus is specifically integrated in a network device is used for description.

First, a cross-entropy loss function corresponding to labels such as classes is defined as follows:

$$\mathcal{L}_W(x_i, y_i) = \frac{1}{m}\sum_{j}^{m} r_t^j[-\eta y_{ij}\log(p_{ij}) - (1 - y_{ij})\log(1 - p_{ij})]$$

$p_{ij}=f_W(x_i, j)\in[0, 1]$ represents a posteriori probability, that is, a prediction probability, of a $j^{th}$ class. W represents a set of trainable parameters of the model. $y_i\in[0, 1]^m$ represents a given label vector of an $i^{th}$ training image xi (that is, a sample label set of the $i^{th}$ training image xi). If a $j^{th}$ object exists in the image, a $j^{th}$ element of yi is 1; otherwise, the $j^{th}$ element of yi is 0. m is the quantity of label types, that is, the quantity of classes, of the multi-label image training set.

η is a weight parameter of the positive label loss, and a value of η represents a weight of the positive label loss. In an actual application, η is preferably set to 12, to suppress the unbalance between positive and negative labels within the class.

rtj is a cross-entropy loss attenuation parameter. In the cross-entropy loss function, a cross-entropy loss adaptive attenuation parameter (also referred to as an adaptive weight parameter of the cross-entropy loss) $r_t^j=0.9^{t-1}$ is added, where t represents the number of times that positive (negative) samples of the class j occur successively in a current batch of training images. It can be learned from the formula that, a value of the cross-entropy loss adaptive parameter may be obtained through t, that is, the cross-entropy loss adaptive parameter is updated through t.

Figure 4:
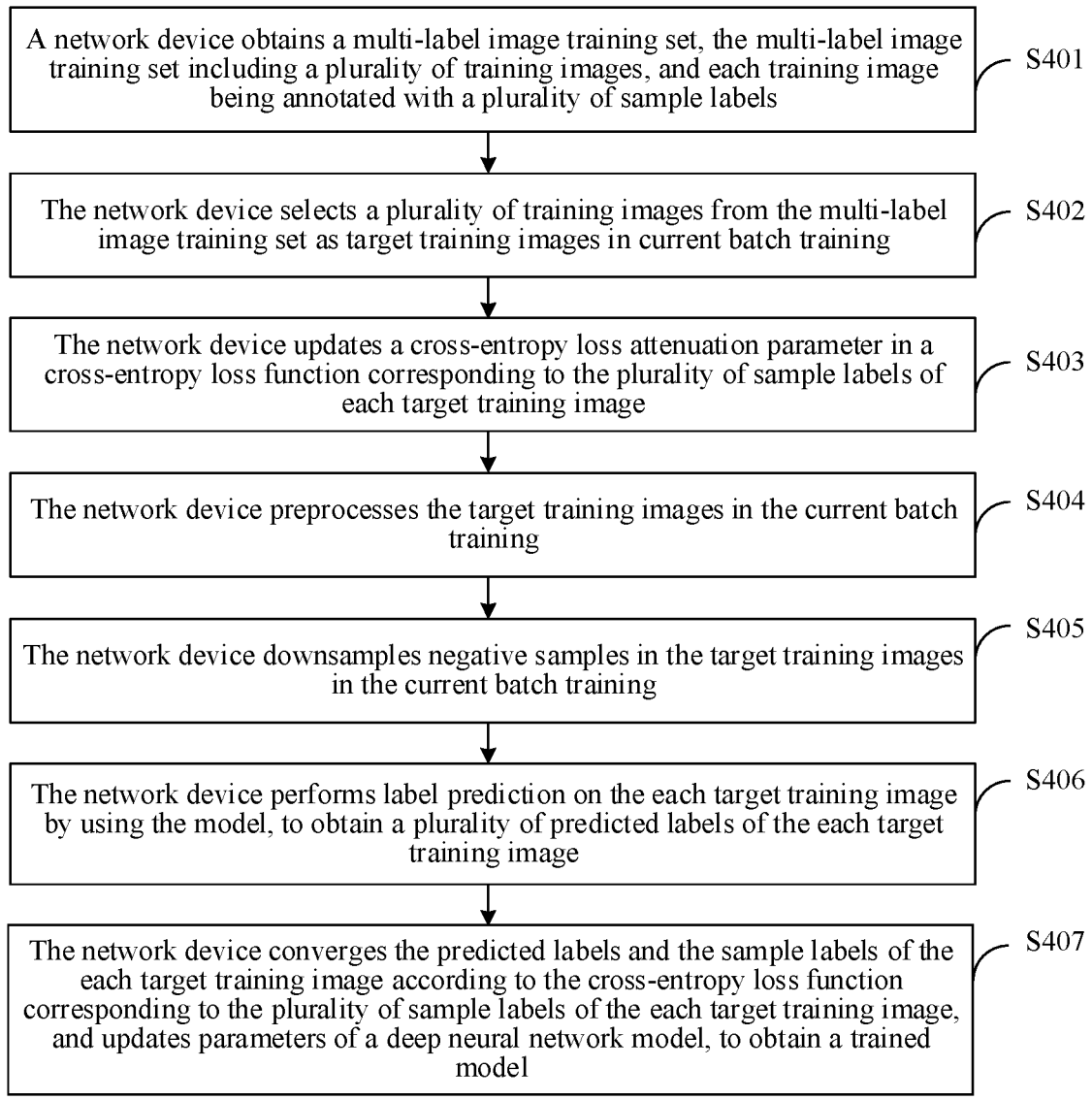
FIG. 4 is another schematic flowchart of a model training method according to an embodiment of the present disclosure.

Then, the model is trained by using the foregoing cross-entropy loss function, and as shown in FIG. 4, a specific process of the model training method includes the following steps:

S401. The network device obtains a multi-label image training set, the multi-label image training set including a plurality of training images, and each training image being annotated with a plurality of sample labels.

The multi-label image training set may include at least one image annotated with a plurality of labels (for example, a plurality of object classes). The image may be referred to as a multi-label image. The multi-label image training set may include a plurality of multi-label images, and contains a plurality of object classes. For example, the multi-label image training set may be a multi-label image data set ML-Images.

S402. The network device selects a plurality of training images from the multi-label image training set as target training images in current batch training.

The network device may use a plurality of batches of training images to train the model, that is, the network device may select a plurality of target training images used for model training from the multi-labeled image training set each time.

In an actual application, the quantity of training images selected for each batch, that is, each batch training, may be the same, such as 100, or may be different. For example, 100 training images are selected for the first time, and 400 training images are selected for the second time.

S403. The network device updates a cross-entropy loss attenuation parameter in a cross-entropy loss function corresponding to the plurality of sample labels of each target training image.

For example, the network device obtains a first training image overall type of each sample label of target training images of adjacent batch training, and the number of times that training images having labels the same as the sample label occur successively; obtains a second training image overall type of each sample label of the target training images of the current batch training; compares the first training image overall type with the second training image overall type, to obtain a comparison result; obtains, according to the comparison result and the number of times, a target number of times that training images having labels the same as the sample label occur successively in current batch training; and updates the cross-entropy loss attenuation parameter according to the target number of times, to obtain an updated cross-entropy loss function.

The target number of times is t, and may be obtained based on the comparison result of the image overall types between the current batch training and the adjacent historical batch training, and the number of times that the positive (negative) training images of the sample label occur successively in the adjacent historical batch training.

Specifically, for the updating of the cross-entropy attenuation parameter, refer to the description of the foregoing embodiments, and details are not described herein again.

S404. The network device preprocesses the each target training image in the current batch training.

For the preprocessing of the images, refer to the foregoing description. For example, corresponding regional images may be extracted from the target training images, the regional images are scaled to a predetermined size, to obtain scaled images, and random disturbance processing is performed on the scaled images.

S405. The network device downsamples negative samples in the target training images in the current batch training.

To suppress unbalanced positive and negative images between labels, such as classes, and improve the model accuracy and visual performance, a downsampling operation and the like may be further performed on negative training images in a negative sample set.

When the deep neural network model includes an output layer, and the output layer includes a plurality of output functions, a parameter in an output function corresponding to the sample label is updated according to a preset processing probability when the target training images are all negative training images without the sample label.

Negative training images without the sample label in the target training images are randomly downsampled when a positive training image with the sample label exists in the target training images.

For example, in an actual application, in each batch of training images, for each class, most of the images are negative, that is, the class does not exist in the images, and even all the images are negative for the class. To suppress the unbalance, the following measures may be used according to the foregoing description:
 a) If images in a current batch of data are all negative for a specific class, parameters of a Sigmoid function corresponding to the class are updated according to a probability of 0.1.
 b) If there are positive images, negative images are randomly downsampled, so that a ratio of positive images to negative images is not less than 1:5.

S406. The network device performs label prediction on the each target training image by using the model, to obtain a plurality of predicted labels of the each target training image.

S407. The network device converges the predicted labels and the sample labels of the each target training image according to the cross-entropy loss function corresponding to the plurality of sample labels of the each target training image, and updates parameters of the deep neural network model, to obtain a trained model.

In one embodiment of the present disclosure, by continuously selecting training images of each batch, the model parameters may be trained in the foregoing manner, to obtain the trained deep neural network model.

For the cross-entropy loss function, refer to the foregoing description.

The deep neural network model may be a model based on a deep learning network such as a convolutional neural network, and may be, for example, a residual neural network (ResNet) model. Specifically, for the structure of the residual network, refer to the foregoing description.

In one embodiment of the present disclosure, the model may be trained by using a back propagation algorithm together with a stochastic gradient descent algorithm with momentum. For example, a cross-entropy loss descent gradient (which may be obtained by deriving the loss function) of the predicted labels and the sample labels of the training image may be obtained according to the cross-entropy loss function. Then, the model parameters in the deep neural network model are trained based on the cross-entropy loss descending gradient. Specifically, the model parameters may be updated based on the cross-entropy loss descent gradient and a learning rate corresponding to the model parameters (that is, a learning rate corresponding to a layer in which the model parameters are located).

In the following, it may be verified, through experiments, that the model training method provided in one embodiment of the present disclosure has the advantages of high accuracy, high visual performance, and the like.

First, a training algorithm and hyper-parameters are determined: a ResNet-101 model is trained by using a common back propagation algorithm together with a stochastic gradient descent algorithm with momentum. The hyper-parameters of the training are as follows: A batch image quantity is 4096. A warm-up policy is used for a learning rate. An initial learning rate is 0.01, and is multiplied by 1.297 at each epoch until a learning rate of the 9$^{th}$ epoch becomes 0.08. Then, the learning rate attenuates every 25 epochs by a multiplier of 0.1 until the 60$^{th}$ epoch. A magnitude of the momentum is 0.9. During an update of batch normalization parameters, an attenuation factor of a moving average is 0.9, and 1e−5 is added to a variance of denominators, to avoid zero variance. In addition, an L2 regularization term may be further added to all training parameters, and a weight parameter of the L2 regularization term is 0.0001.

Measure criterions: To verify the performance of the ResNet-101 model trained on the multi-label data, that is, ML-Images, a test may be performed on a validation set of ML-Images, and three common multi-label measure criterions, including a precision rate, a recall rate and an F1 index, are used. Because an output of each Sigmoid function is a continuous value between 0 and 1. That is, for a posterior probability of each class, a posterior probability vector needs to be first transformed into a binary vector and then measured. A posterior probability vector of a continuous value is given. Elements corresponding to the first k maximum values may be set to 1, representing prediction of positive labels. Other elements are set to 0, representing prediction of negative labels. For an i$^{th}$ test image, a binary prediction vector $y_i^k \in \{0, 1\}^m$ may be obtained. The definitions of the three measure criterions for sampling are as follows:

$$P_k = \frac{1}{n}\sum_i^n P_{i,k} = \frac{1}{n}\sum_i^n \frac{y_i * \hat{y}_i^k}{k}.$$

$$R_k = \frac{1}{n}\sum_i^n R_{i,k} = \frac{1}{n}\sum_i^n \frac{y_i * \hat{y}_i^k}{1^\top * y_i},$$

$$F1_k = \frac{1}{n}\sum_i^n \frac{2P_{i,k} * R_{i,k}}{P_{i,k} + R_{i,k}}.$$

Experimental results: Two results are shown by using the model training method provided in one embodiment of the present disclosure, which are k=5 and k=10 respectively. The experimental results are shown in the following table. Numerical values of all indexes are not too high, mainly because: 1) annotations of ML-Images contain noise; 2) for many classes, training samples are insufficient (quantities of training images for about 5000 classes do not exceed 1000).

TABLE 1

|  | Precision rate | Recall rate | F1 index |
| --- | --- | --- | --- |
| Top-5 prediction results | 43.7% | 22.9% | 29.5% |
| Top-10 prediction results | 33.7% | 35.6% | 33.9% |

In an embodiment, after the deep neural network model is trained in the foregoing manner, a deep neural network model with a multi-label prediction or output may be changed to a classification model with a single-label prediction or output through transfer learning, thereby improving the universality of the model.

For example, the network device may replace a plurality of output functions in an output layer of the trained deep neural network model with a single-label classifier, to obtain a changed network model; perform adaptive adjustment on a learning rate of each layer in the changed network model according to a principle that a learning rate of a higher layer is greater than a learning rate of a lower layer, to obtain an adjusted network model; and train parameters of the adjusted network model according to a single-label training image set, to obtain a single-label image classification model.

Specifically, output layers (that is, a plurality of independent Sigmoid functions) of the ResNet-101 model with a multi-label output trained on ML-Images may be replaced with a single-label classifier (that is, a single Softmax function). Then, hierarchical adaptive learning rate fine tuning is performed on the learning rate of each layer in the changed network model. Next, model parameters of the adjusted network model are trained on the single-label training image set such as an ImageNet data set, to obtain a single-label image classification model. The model parameters include: parameters of the single-label classifier (that is, the single Softmax function), other model parameters, and the like.

The method of hierarchical adaptive learning rate fine-tuning is performing adaptive adjustment on the learning rate of each layer in the changed network model according to a principle that the learning rate of the higher layer is greater than the learning rate of the lower layer. Specifically, the learning rate of the higher layer is set to be greater than that of the lower layer. That is, a layer closer to the output has a higher learning rate.

By using the foregoing method, transfer learning may be performed on the ResNet-101 model with a multi-label output trained on the multi-label image training set ML-Images, so that the ResNet-101 model with a multi-label output trained on ML-Images can help other visual tasks such as single-label image classification.

The effectiveness and advantages of the transfer learning method provided in the present disclosure are verified through experiments.

For example, three different models may be set to carry out comparison experiments:
(1). Model 1: A ResNet-101 model with a single-label output is trained directly on the ImageNet training data set, and is tested on an ImageNet validation set.
(2). Model 2: The output layers (that is, the plurality of independent Sigmoid functions) of the ResNet-101 model with a multi-label output trained on ML-Images are replaced with the single-label classifier (that is, the single Softmax function). The parameters of the Softmax function are trained on the ImageNet data set, and learning rate consistency fine-tuning is performed on parameters of other layers (see below).
(3). Model 3: The output layers (that is, the plurality of independent Sigmoid functions) of the ResNet-101 model with a multi-label output are replaced with the single-label classifier (that is, the single Softmax function). The parameters of the Softmax function are trained on the ImageNet data set, and hierarchical adaptive learning rate fine-tuning is performed on parameters of other layers (see below).

Fine-tuning learning rate: In transfer learning of the deep neural network, it is a very important and critical step to perform fine-tuning on the model parameters. This not only can reserve the visual expression ability of the initial parameters, but also can perform adjustment according to a difference between the original data set and the target data set. The hyper parameters of a common fine-tuning algorithm are set as follows: a relatively high initial learning rate is set for the parameters of the output layer, and a relatively low learning rate is set for parameters of all other layers. Because learning rates of all layers except the output layer are consistent, the fine-tuning algorithm of such a standard is referred to as a learning rate consistency fine-tuning algorithm. However, considering differences (including an image difference and an annotation difference) between the pre-training data set ML-Images and the target data set (that is, ImageNet), the embodiments of the present disclosure provide a fine-tuning algorithm for hierarchical adaptive learning rates. Specifically, parameters of a higher layer are more relevant to the training data set, and thus, a higher learning rate is set. Underlying parameters represent visual information of a lower layer, and are less relevant to the training data set, and thus, a lower learning rate is set.

Other hyper parameter settings: The hyper parameter settings for the three models are shown in the following table:

TABLE 2

| Hyper parameter | Model 1 | Model 2 | Model 3 |
| --- | --- | --- | --- |
| Batch image quantity | | 2048 | |
| Epoch upper limit | | 120 | |
| Learning rate of higher layers (first two stages) | 0.8 | 0.008 | 0.8 |
| Learning rate of lower layers (last two stages) | 0.8 | 0.008 | 0 |
| Learning rate attenuation ratio | | 0.1 | |
| Learning rate attenuation interval | | 18750 updates (that is, 30 epochs) | |
| Parameter L2 regularization term weight | | 0.0001 | |
| Warm start length | | 2500 updates (that is, 4 epochs) | |
| Warm start initial learning rate | 0.1 | 0.001 | 0.1 |
| Warm start learning rate growth factor | | 1.681 | |
| Warm start learning rate growth interval | | 625 updates (that is, 1 epoch) | |
| Batch regularization attenuation ratio | | 0.9 | |
| Batch regularization eps | 0.00001 | 0.001 | 0.001 |

Experimental results: Experimental results and comparisons with other methods and third-party implementations are shown in the following table. The performance of the model 1 implemented in the present disclosure exceeds that of the model 1 implemented by MSRA and Google. It indicates that the performance of the ResNet model improved in the present disclosure is superior to the performance of an original ResNet model, and the model in the present disclosure implements relatively high quality. Compared with the performance of the model 1, all the performance of the model 2 implemented in the present disclosure declines greatly, and this shows a difference between ML-Images and ImageNet. The model 3 implemented in the present disclosure achieves the best performance, which even exceeds that of the model 2 implemented by Google, and it indicates that the hierarchical adaptive learning rate fine-tuning algorithm provided in the present disclosure can effectively alleviate a difference between the data sets. The model 2 of Google is pre-trained on a JFT-300M dataset. The JFT-300M dataset includes 300 million images, while ML-Images only include 18 million images. By using only about 1/17 of the data volume, the present disclosure surpasses the performance of Google, which fully shows the effectiveness of the model implementation and training algorithm of the present disclosure.

TABLE 3

| Implementation | Model | Top-1 accuracy | Top-5 accuracy |
| --- | --- | --- | --- |
| Third-party implementation | MSRA model 1 | 76.4 | 92.9 |
| | Google model 1 | 77.5 | 93.9 |
| | Google model 2 (pre-trained on J FT-300M) | 79.2 | 94.7 |
| Implementation in the present disclosure | Model 1 | 78.2 | 94.0 |
| | Model 2 | 74.7 | 92.6 |
| | Model 3 | 79.54 | 94.7 |

The model training method provided in one embodiment of the present disclosure may be applied to vision-related services, for example, article image quality evaluation and recommendation, and object recognition in a game. All models trained by using the method of the embodiments of the present disclosure achieve good effects. In addition, the model further provides an excellent initial model for other more general visual services, including image understanding, video understanding, and the like.

It can be learned from the above that, in one embodiment of the present disclosure, the weight of the positive label loss may be increased in the cross-entropy loss function, and the weight is greater than 1. The predicted labels and the sample labels of the target training image are converged according to the cross-entropy loss function, to obtain a trained deep neural network model. In this solution, the cross-entropy loss function with the weight may be used for training the model parameters of the deep neural network model, and the value of the weight parameter in the cross-entropy function is greater than 1, so that the problem of unbalanced positive and negative labels between classes can be suppressed, and the accuracy and the visual performance of the model are improved. In addition, in this solution, the problem of class unbalance may be further suppressed through adaptive attenuation of the cross-entropy loss and downsampling of negative samples, to further improve the accuracy and the visual performance of the model.

To better implement the foregoing method, the embodiments of the present disclosure further provide a model training apparatus. The model training apparatus may be specifically integrated in a network device, for example, a device such as a terminal or a server. The terminal may include a mobile phone, a tablet computer, a notebook computer, a PC, or the like.

Figure 5A:
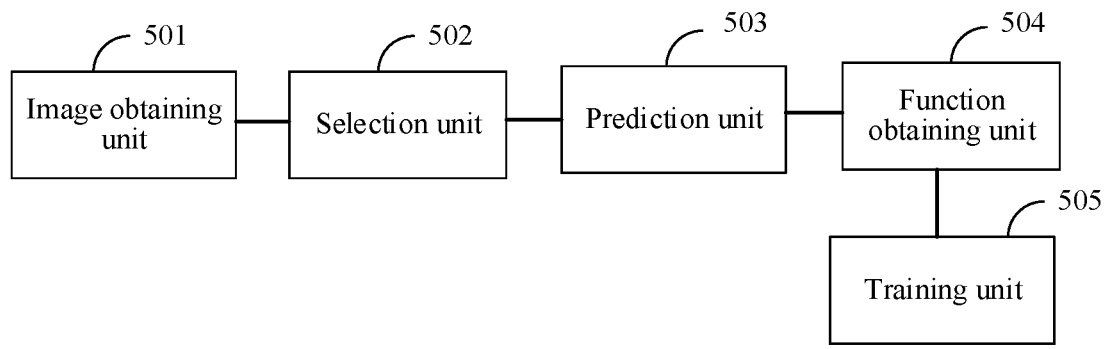
FIG. 5A is a schematic structural diagram of a model training apparatus according to an embodiment of the present disclosure.

For example, as shown in FIG. 5A, the model training apparatus may include: an image obtaining unit 501, a selection unit 502, a prediction unit 503, a function obtaining unit 504, and a training unit 505.

The image obtaining unit 501 is configured to obtain a multi-label image training set, the multi-label image training set including a plurality of training images, and each training image being annotated with a plurality of sample labels.

The selection unit 502 is configured to select a plurality of training images from the multi-label image training set as target training images used for training a current model.

The prediction unit 503 is configured to perform label prediction on each target training image by using the model, to obtain a plurality of predicted labels of the each target training image.

The function obtaining unit 504 is configured to obtain a cross-entropy loss function corresponding to the plurality of sample labels of the each target training image, a positive label loss in the cross-entropy loss function being provided with a weight, and the weight being greater than 1, so that the positive label loss is greater than a negative label loss.

The training unit 505 is configured to converge the predicted labels and the sample labels of the each target training image according to the cross-entropy loss function, and update parameters of the model, to obtain a trained model.

Figure 5B:
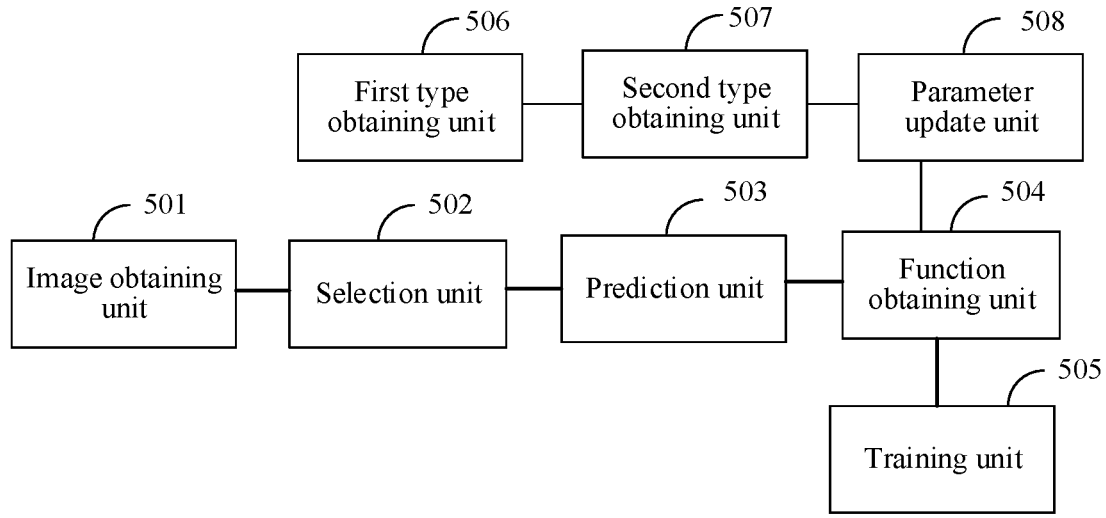
FIG. 5B is another schematic structural diagram of a model training apparatus according to an embodiment of the present disclosure.

In an embodiment, referring to FIG. 5B, the cross-entropy loss function further includes: a cross-entropy loss attenuation parameter. The model training apparatus further includes: a first type obtaining unit 506, a second type obtaining unit 507, and a parameter update unit 508.

The selection unit 502 may be specifically configured to use the selected plurality of training images as target training images of a current batch.

The first type obtaining unit 506 is configured to: obtain, before the training unit 505 converges the predicted labels and the sample labels of the each target training image according to the cross-entropy loss function, a first training image overall type corresponding to each sample label of target training images of an adjacent batch, and the number of times that training images having labels the same as the sample label occur successively, the first training image overall type corresponding to the sample label being used for indicating whether one or more successive training images having labels the same as the sample label exist in the target training images of the adjacent batch.

The second type obtaining unit 507 is configured to obtain a second training image overall type corresponding to each sample label of the target training images of the current batch, the second training image overall type corresponding to the each sample label being used for indicating whether one or more successive training images having labels the same as the sample label exist in the target training images of the current batch.

The parameter update unit 508 is configured to update the cross-entropy loss attenuation parameter according to the first training image overall type, the second training image overall type and the number of times.

In one embodiment, the parameter update unit 508 may be specifically configured to:

compare the first training image overall type with the second training image overall type, to obtain a comparison result;

obtain, according to the comparison result and the number of times, a target number of times that current training images having the sample label occur successively in current batch training; and update the cross-entropy loss attenuation parameter according to the target number of times, to obtain an updated cross-entropy loss function.

In an embodiment, the deep neural network model includes an output layer, the output layer including a plurality of output functions. The prediction unit 503 may be specifically configured to: for each sample label of the each target training image, update, according to a preset processing probability, a parameter in an output function corresponding to the sample label when the target training images are all negative training images without the sample label, to obtain an updated model; and perform label prediction on the each target training image by using the updated model, to obtain the plurality of predicted labels of the each target training image.

In an embodiment, the deep neural network model includes an output layer, the output layer including a plurality of output functions. The prediction unit 503 may be specifically configured to: for each sample label of the each target training image, randomly downsample negative training images without the sample label in the target training images when a positive training image with the sample label exists in the target training images, to obtain downsampled target training images; and perform label prediction on the downsampled target training images by using the model, to obtain the plurality of prediction labels of the each target training image.

In an embodiment, the prediction unit 503 is specifically configured to: randomly downsample the negative training images without the sample label in the target training images according to a preset positive-negative training image ratio corresponding to the sample label.

Figure 5C:
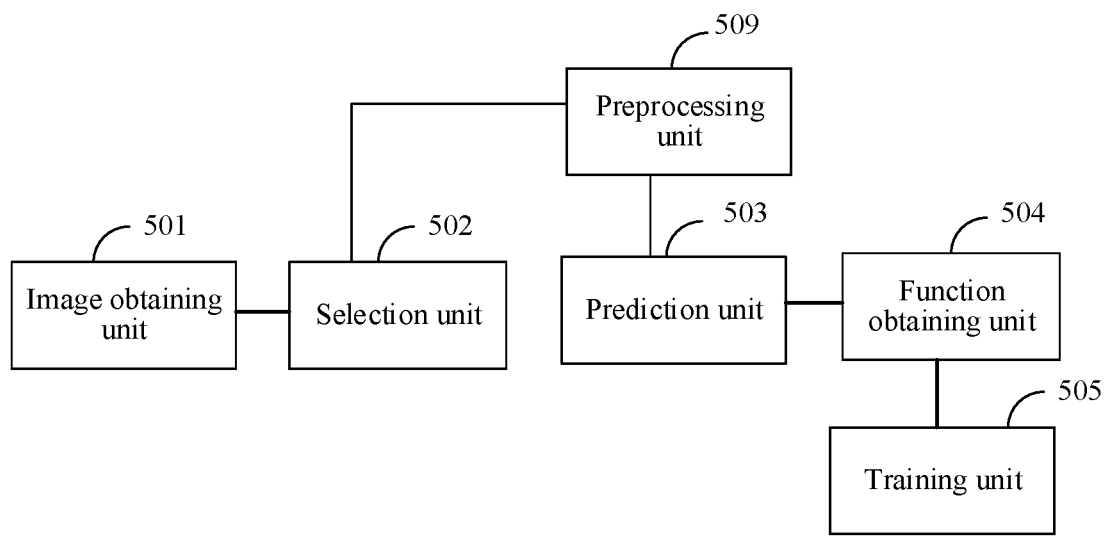
FIG. 5C is another schematic structural diagram of a model training apparatus according to an embodiment of the present disclosure.

In an embodiment, referring to FIG. 5C, the model training apparatus may further include a preprocessing unit 509.

The preprocessing unit 509 may be specifically configured to:

extract a corresponding regional image from the target training image;

scale the regional image to a preset size, to obtain a scaled image; and perform random disturbance processing on the scaled image, to obtain a preprocessed training image.

In this case, the prediction unit 503 may be specifically configured to: perform label prediction on each processed target training image by using the model.

In an embodiment, the performing, by the preprocessing unit 509, random disturbance processing on the scaled image may include:

performing horizontal flip processing on the scaled image according to a first processing probability, to obtain the flipped image;

performing rotation processing with a random angle on the flipped image according to a second processing probability, to obtain a rotated image, the random angle being an angle randomly selected from a predetermined angle range;

separately performing disturbance processing on attributes of the rotated image (e.g., individual disturbance processing may be performed on saturation, contrast, brightness, and/or chrominance of the rotated image) according to a third processing probability, to obtain a processed image; and scaling a pixel value of the processed image to a preset pixel value range.

In an embodiment, the deep residual network model includes a deep residual network model. The deep residual network model includes a plurality of residual blocks that are sequentially connected, each residual block includes a convolution branch and a residual branch, a convolution kernel size of a first convolutional layer in the convolution branch is less than a convolution kernel size of a second convolutional layer following the first convolutional layer, and a convolution step size of the second convolutional layer is greater than a convolution step size of the first convolutional layer and less than a convolution kernel width of the second convolutional layer.

Figure 5D:
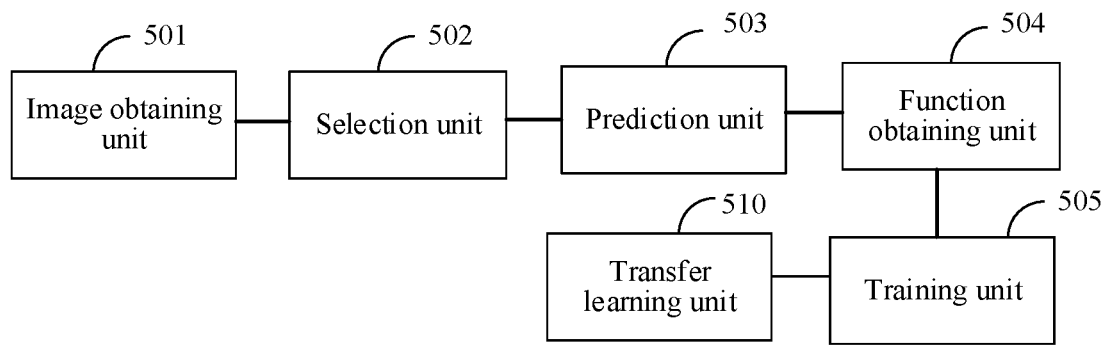
FIG. 5D is another schematic structural diagram of a model training apparatus according to an embodiment of the present disclosure.

In an embodiment, referring to FIG. 5D, the model training apparatus may further include a transfer learning unit 510.

The transfer learning unit 510 may be specifically configured to:

replace a plurality of output functions in an output layer of the trained model with a single-label classifier, to obtain a changed network model;

perform adaptive adjustment on a learning rate of each layer in the changed network model according to a principle that a learning rate of a higher layer is greater than a learning rate of a lower layer, to obtain an adjusted network model; and train parameters of the adjusted network model according to a single-label training image set, to obtain a single-label image classification model.

In some embodiments, the training unit 505 is configured to obtain a cross-entropy loss descending gradient of the predicted labels and the sample labels of the each target training image according to the cross-entropy loss function; and train the model parameters in the model based on the cross-entropy loss descending gradient, and update the model parameters in the model, to obtain the trained model.

During specific implementation, the foregoing units may be implemented as independent entities, or may be randomly combined, or may be implemented as the same entity or several entities. For specific implementations of the foregoing units, reference may be made to the foregoing method embodiments. Details are not described herein again.

It can be learned from the above that, in the model training apparatus in one embodiment, the image obtaining unit 501 may obtain a multi-label image training set; the selection unit 502 may select a plurality of training images from the multi-label image training set as target training images used for training a current model; the prediction unit 503 may perform label prediction on each target training image by using the model, to obtain a plurality of predicted labels of the each target training image; the function obtaining unit 504 may obtain a cross-entropy loss function corresponding to the plurality of sample labels of the each target training image, a positive label loss in the cross-entropy loss function being provided with a weight, and the weight being greater than 1, so that the positive label loss is greater than a negative label loss; and the training unit 505 may converge the predicted labels and the sample labels of the each target training image according to the cross-entropy loss function, and update parameters of the model, to obtain a trained model. In this solution, the cross-entropy loss function with the weight may be used for training the model parameters of the image recognition model, and the value of the weight parameter in the cross-entropy function is greater than 1, so that the problem of unbalanced positive and negative labels between classes can be suppressed, and the accuracy and the visual performance of the model are improved.

Figure 6:
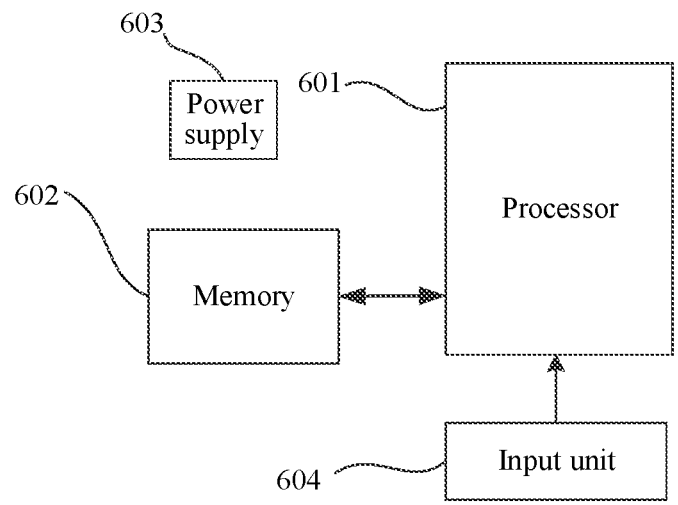
FIG. 6 is a schematic structural diagram of a network device according to an embodiment of the present disclosure.

The embodiments of the present disclosure further provide a network device, and the network device may be a device such as server or a terminal. FIG. 6 is a schematic structural diagram of a network device according to an embodiment of the present disclosure. Specifically:

The network device may include components such as a processor 601 including one or more processing cores, a memory 602 including one or more computer-readable storage media, a power supply 603, and an input unit 604. A person skilled in the art may understand that the structure of the network device shown in FIG. 6 does not constitute a limitation to the network device, and the network device may include more or fewer components than those shown in the figure, or some components may be combined, or a different component deployment may be used.

The processor 601 is a control center of the network device, and connects various parts of the entire network device by using various interfaces and lines. By running or executing software programs and/or modules stored in the memory 602, and invoking data stored in the memory 602, the processor 601 performs various functions and data processing of the network device, thereby performing overall monitoring on the network device. The processor 601 may include one or more processing cores. The processor 601 may integrate an application processor and a modem processor. The application processor mainly processes an operating system, a user interface, an application program, and the like. The modem processor mainly processes wireless communication. It may be understood that the foregoing modem processor may alternatively not be integrated into the processor 601.

The memory 602 may be configured to store a software program and a module, and the processor 601 runs the software program and the module that are stored in the memory 602, to implement various functional applications and data processing. The memory 602 may mainly include a program storage area and a data storage area. The program storage area may store an operating system, an application program required by at least one function (such as a sound playing function and an image display function), and the like. The data storage area may store data created according to use of the network device, and the like. In addition, the memory 602 may include a high speed random access memory, and may further include a non-volatile memory, such as at least one magnetic disk storage device, a flash memory device or other non-volatile solid state storage devices. Correspondingly, the memory 602 may further include a memory controller, so that the processor 601 can access the memory 602.

The network device further includes the power supply 603 for supplying power to the components. The power supply 603 may be logically connected to the processor 601 by using a power management system, thereby implementing functions such as charging, discharging, and power consumption management by using the power management system. The power supply 603 may further include one or more direct current or alternating current power supplies, a re-charging system, a power failure detection circuit, a power supply converter or inverter, a power supply state indicator, and any other component.

The network device may further include the input unit 604. The input unit 604 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in one embodiment, the processor 601 in the network device may load, according to the following instructions, executable files corresponding to processes of one or more application programs to the memory 602, and runs the application programs stored in the memory 602, so as to implement various functions. Details are as follows:

obtaining a multi-label image training set, the multi-label image training set including a plurality of training labels, and each training image being annotated with a plurality of sample labels; selecting a plurality of training images from the multi-label image training set as target training images for training a current model; performing label prediction on each target training image by using the model, to obtain a plurality of predicted labels of the each target training image; obtaining a cross-entropy loss function corresponding to the plurality of sample labels of the each target training image, a positive label loss in the cross-entropy loss function being provided with a weight, and the weight being greater than 1, so that the positive label loss is greater than a negative label loss; and converging the predicted labels and the sample labels of the each target training image according to the cross-entropy loss function, and updating parameters of the model, to obtain a trained model.

For specific implementations of the foregoing operations, reference may be made to the foregoing embodiments. Details are not described herein again.

It can be learned from the above that, the network device in one embodiment may obtain a multi-label image training set; select a plurality of training images from the multi-label image training set as target training images used for training a current model; perform label prediction on each target training image by using the model, to obtain a plurality of predicted labels of the each target training image; obtain a cross-entropy loss function corresponding to the plurality of sample labels of the each target training image, a positive label loss in the cross-entropy loss function being provided with a weight, and the weight being greater than 1, so that the positive label loss is greater than a negative label loss; and converge the predicted labels and the sample labels of the each target training image according to the cross-entropy loss function, and update parameters of the model, to obtain a trained model. In this solution, the cross-entropy loss function with the weight may be used for training the model parameters for image recognition, and the value of the weight parameter in the cross-entropy function is greater than 1, so that the problem of unbalanced positive and negative labels between classes can be suppressed, and the accuracy and the visual performance of the model are improved.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

Accordingly, the embodiments of the present disclosure provide a storage medium, storing a plurality of instructions, the instructions being configured to be loaded by a processor, to perform the steps in any model training method according to the embodiments of the present disclosure. For example, the instructions may perform the following steps:
obtaining a multi-label image training set, the multi-label image training set including a plurality of training labels, and each training image being annotated with a plurality of sample labels; selecting a plurality of training images from the multi-label image training set as target training images for training a current model; performing label prediction on each target training image by using the model, to obtain a plurality of predicted labels of the each target training image; obtaining a cross-entropy loss function corresponding to the plurality of sample labels of the each target training image, a positive label loss in the cross-entropy loss function being provided with a weight, and the weight being greater than 1, so that the positive label loss is greater than a negative label loss; and converging the predicted labels and the sample labels of the each target training image according to the cross-entropy loss function, and updating parameters of the model, to obtain a trained model.

The storage medium may include: a read-only memory (ROM), a random access memory (RAM), a magnetic disk, an optical disc, or the like.

Because the instructions stored in the storage medium may perform the steps of any model training method provided in the embodiments of the present disclosure, the instructions can implement beneficial effects that may be implemented by any model training method provided in the embodiments of the present disclosure. For details, reference may be made to the foregoing embodiments. Details are not described herein again.

The model training method and apparatus, and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. In addition, a person skilled in the art may make modifications to the specific implementations and application range according to the idea of the present disclosure. In conclusion, the content of this specification is not construed as a limitation to the present disclosure.

What is claimed is:

1. A model training method for image recognition, performed by a network device, the method comprising:
obtaining a multi-label image training set, the multi-label image training set comprising a plurality of batches of training images, and each training image being annotated with a plurality of sample labels;
performing a plurality of times of batch training on an image recognition model based on the plurality of batches of training images, comprising: for a current batch training:
selecting target training images of a current batch from the multi-label image training set for training a current model of the image recognition model;
performing label prediction on each target training image by using the current model, to obtain a plurality of predicted labels of the each target training image;
obtaining a first training image overall type corresponding to each sample label of target training images of an adjacent batch training, and a number of times that training images having labels the same as the sample label occur successively within the adjacent batch training, the first training image overall type corresponding to the sample label indicating whether one or more successive training images having labels the same as the sample label exist in the adjacent batch training;
obtaining a second training image overall type corresponding to each sample label of the target training images of the current batch training, the second training image overall type corresponding to the each sample label indicating whether one or more successive training images having labels the same as the sample label exist in the current batch training;
obtaining a cross-entropy loss function corresponding to the plurality of sample labels of the each target training image and updating a cross-entropy loss attenuation parameter of the cross-entropy loss function according to the first training image overall type, the second training image overall type and the number of times, a positive label loss in the cross-entropy loss function being provided with a weight greater than 1, and the positive label loss is greater than a negative label loss; and
converging the predicted labels and the sample labels of the each target training image according to the cross-entropy loss function to update parameters of the current model, to obtain a trained model of the image recognition model corresponding to the current batch training,
wherein:
the method further comprises: before the performing label prediction on each target training image by using the current model, extracting a corresponding regional image from the target training image; scaling the regional image to a preset size, to obtain a scaled image; and performing random disturbance processing on the scaled image, to obtain a preprocessed training image; and
the performing label prediction on each target training image by using the current model comprises: performing label prediction on each preprocessed training image by using the current model.

2. The model training method according to claim 1, wherein the updating the cross-entropy loss attenuation parameter according to the first training image overall type, the second training image overall type and the number of times comprises:
comparing the first training image overall type with the second training image overall type, to obtain a comparison result;
obtaining, according to the comparison result and the number of times, a target number of times that current training image having the sample label occur successively in the current batch training; and
updating the cross-entropy loss attenuation parameter according to the target number of times, to obtain an updated cross-entropy loss function.

3. The model training method according to claim 1, wherein the current model comprises an output layer, the output layer comprising a plurality of output functions; and
the performing label prediction on each target training image by using the current model, to obtain a plurality of predicted labels of the each target training image comprises:
for each sample label of the each target training image,
updating, according to a preset processing probability, a parameter in an output function corresponding to the sample label when the target training images are all negative training images without the sample label, to obtain an updated model; and
performing label prediction on the each target training image by using the updated model, to obtain the plurality of predicted labels of the each target training image.

4. The model training method according to claim 1, wherein the performing label prediction on each target training image by using the current model, to obtain a plurality of predicted labels of the each target training image comprises:
for each sample label of the each target training image,
randomly downsampling negative training images without the sample label in the target training images when a positive training image with the sample label exists in the target training images, to obtain downsampled target training images; and
performing label prediction on the downsampled target training images by using the current model, to obtain the plurality of prediction labels of the each target training image.

5. The model training method according to claim 4, wherein the randomly downsampling negative training images without the sample label in the target training images comprises: randomly downsampling the negative training images without the sample label in the target training images according to a preset positive-negative training image ratio corresponding to the sample label.

6. The model training method according to claim 1, wherein the performing random disturbance processing on the scaled image comprises at least one of:
flipping the scaled image horizontally according to a first processing probability, to obtain a flipped image;
rotating the scaled image with a random angle according to a second processing probability, to obtain a rotated image, the random angle being an angle randomly selected from a predetermined angle range;
separately performing disturbance processing on one or more attributes of the scaled image according to a third processing probability, to obtain a processed image; or
scaling a pixel value of the scaled image to a preset pixel value range.

7. The model training method according to claim 1, wherein the current model comprises a deep residual network model;
the deep residual network model comprises a plurality of residual blocks that are sequentially connected, each residual block comprises a convolution branch and a residual branch,
a convolution kernel size of a first convolutional layer in the convolution branch is less than a convolution kernel size of a second convolutional layer following the first convolutional layer, and a convolution step size of the second convolutional layer is greater than a convolution step size of the first convolutional layer and less than a convolution kernel width of the second convolutional layer.

8. The model training method according to claim 1, further comprising:
replacing a plurality of output functions in an output layer of the trained model with single-label classifiers, to obtain a changed network model for each sample label;
performing adaptive adjustment on a learning rate of each layer in the changed network model according to a principle that a learning rate of a higher layer is greater than a learning rate of a lower layer, to obtain an adjusted network model; and
training parameters of the adjusted network model according to a single-label training image set, to obtain a single-label image classification model for each sample label.

9. The model training method according to claim 1, wherein the converging the predicted labels and the sample labels of the each target training image according to the cross-entropy loss function, and updating parameters of the current model, to obtain a trained model comprises:
obtaining a cross-entropy loss descending gradient of the predicted labels and the sample labels of the each target training image according to the cross-entropy loss function; and
training the model parameters in the current model based on the cross-entropy loss descending gradient, and updating the model parameters in the current model, to obtain the trained model.

10. A network device, comprising: at least one processor, and
at least one memory connected to the at least one processor, the at least one memory storing machine-readable instructions, the at least one processor is configured, when executing the machine-readable instructions, to perform:

obtaining a multi-label image training set, the multi-label image training set comprising a plurality of batches of training images, and each training image being annotated with a plurality of sample labels;

performing a plurality of times of batch training on an image recognition model based on the plurality of batches of training images, comprising: for a current batch training:

selecting target training images of a current batch from the multi-label image training set for training a current model of the image recognition model;

performing label prediction on each target training image by using the current model, to obtain a plurality of predicted labels of the each target training image;

obtaining a first training image overall type corresponding to each sample label of target training images of an adjacent batch training, and a number of times that training images having labels the same as the sample label occur successively within the adjacent batch training, the first training image overall type corresponding to the sample label indicating whether one or more successive training images having labels the same as the sample label exist in the adjacent batch training;

obtaining a second training image overall type corresponding to each sample label of the target training images of the current batch training, the second training image overall type corresponding to the each sample label indicating whether one or more successive training images having labels the same as the sample label exist in the current batch training;

obtaining a cross-entropy loss function corresponding to the plurality of sample labels of the each target training image and updating a cross-entropy loss attenuation parameter of the cross-entropy loss function according to the first training image overall type, the second training image overall type and the number of times, a positive label loss in the cross-entropy loss function being provided with a weight greater than 1, and the positive label loss is greater than a negative label loss; and converging the predicted labels and the sample labels of the each target training image according to the cross-entropy loss function to update of the current model, to obtain a trained model of the image recognition model corresponding to the current batch training, wherein:

the at least one processor is further configured to perform: before the performing label prediction on each target training image by using the current model, extracting a corresponding regional image from the target training image; scaling the regional image to a preset size, to obtain a scaled image; and performing random disturbance processing on the scaled image, to obtain a preprocessed training image; and the performing label prediction on each target training image by using the current model comprises: performing label prediction on each preprocessed training image by using the current model.

11. The network device according to claim 10, wherein the updating the cross-entropy loss attenuation parameter according to the first training image overall type, the second training image overall type and the number of times comprises:

comparing the first training image overall type with the second training image overall type, to obtain a comparison result;

obtaining, according to the comparison result and the number of times, a target number of times that current training image having the sample label occur successively in the current batch training; and updating the cross-entropy loss attenuation parameter according to the target number of times, to obtain an updated cross-entropy loss function.

12. The network device according to claim 10, wherein the current model comprises an output layer, the output layer comprising a plurality of output functions; and the performing label prediction on each target training image by using the current model, to obtain a plurality of predicted labels of the each target training image comprises:

for each sample label of the each target training image, updating, according to a preset processing probability, a parameter in an output function corresponding to the sample label when the target training images are all negative training images without the sample label, to obtain an updated model; and performing label prediction on the each target training image by using the updated model, to obtain the plurality of predicted labels of the each target training image.

13. The network device according to claim 10, wherein the performing label prediction on each target training image by using the current model, to obtain a plurality of predicted labels of the each target training image comprises:

for each sample label of the each target training image, randomly downsampling negative training images without the sample label in the target training images when a positive training image with the sample label exists in the target training images, to obtain downsampled target training images; and performing label prediction on the downsampled target training images by using the current model, to obtain the plurality of prediction labels of the each target training image.

14. The network device according to claim 13, wherein the randomly downsampling negative training images without the sample label in the target training images comprises: randomly downsampling the negative training images without the sample label in the target training images according to a preset positive-negative training image ratio corresponding to the sample label.

15. The network device according to claim 10, wherein the current model comprises a deep residual network model;

the deep residual network model comprises a plurality of residual blocks that are sequentially connected, each residual block comprises a convolution branch and a residual branch, a convolution kernel size of a first convolutional layer in the convolution branch is less than a convolution kernel size of a second convolutional layer following the first convolutional layer, and a convolution step size of the second convolutional layer is greater than a convolution step size of the first convolutional layer and less than a convolution kernel width of the second convolutional layer.

16. A non-transitory storage medium, storing a plurality of instructions, the instructions being configured to be loaded by at least one processor, to perform:

obtaining a multi-label image training set, the multi-label image training set comprising a plurality of batches of training images, and each training image being annotated with a plurality of sample labels;

performing a plurality of times of batch training on an image recognition model based on the plurality of batches of training images, comprising: for a current batch training:

selecting target training images of a current batch from the multi-label image training set for training a current model of the image recognition model;

performing label prediction on each target training image by using the current model, to obtain a plurality of predicted labels of the each target training image;

obtaining a first training image overall type corresponding to each sample label of target training images of an adjacent batch training, and a number of times that training images having labels the same as the sample label occur successively within the adjacent batch training, the first training image overall type corresponding to the sample label indicating whether one or more successive training images having labels the same as the sample label exist in the adjacent batch training;

obtaining a second training image overall type corresponding to each sample label of the target training images of the current batch training, the second training image overall type corresponding to the each sample label indicating whether one or more successive training images having labels the same as the sample label exist in the current batch training;

obtaining a cross-entropy loss function corresponding to the plurality of sample labels of the each target training image and updating a cross-entropy loss attenuation parameter of the cross-entropy loss function according to the first training image overall type, the second training image overall type and the number of times, a positive label loss in the cross-entropy loss function being provided with a weight greater than 1, and the positive label loss is greater than a negative label loss; and converging the predicted labels and the sample labels of the each target training image according to the cross-entropy loss function to update parameters of the current model, to obtain a trained model of the image recognition model corresponding to the current batch training, wherein:

the instructions further cause the at least one processor to perform: before the performing label prediction on each target training image by using the current model, extracting a corresponding regional image from the target training image; scaling the regional image to a preset size, to obtain a scaled image; and performing random disturbance processing on the scaled image, to obtain a preprocessed training image; and the performing label prediction on each target training image by using the current model comprises: performing label prediction on each preprocessed training image by using the current model.

* * * * *